United States Patent
Garg et al.

(10) Patent No.: US 8,275,067 B2
(45) Date of Patent: Sep. 25, 2012

(54) ADAPTIVE TURBO PEAK MITIGATION FOR PEAK-TO-AVERAGE RATIO (PAR) REDUCTION USING RESERVED TONES

(75) Inventors: Rahul Garg, Faridabad (IN); Patrick Duvaut, Tinton Falls, NJ (US); Harish Jethanandani, Jaipur (IN); Amitkumar Mahadevan, Eatontown, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 975 days.

(21) Appl. No.: 12/139,146

(22) Filed: Jun. 13, 2008

(65) Prior Publication Data

US 2009/0310659 A1 Dec. 17, 2009

(51) Int. Cl.
 *H04L 27/04* (2006.01)
 *H04L 27/36* (2006.01)
 *H04B 1/38* (2006.01)

(52) U.S. Cl. ............... 375/296; 375/222; 375/298

(58) Field of Classification Search .......... 375/132, 375/232, 260–261, 264, 285, 295, 296, 297, 375/298, 316, 317, 346, 219, 220, 222; 370/210, 370/329, 350, 497; 455/73
 See application file for complete search history.

(56) References Cited

U.S. PATENT DOCUMENTS

| | | | |
|---|---|---|---|
| 6,137,869 A | 10/2000 | Voit et al. | |
| 6,314,146 B1 | 11/2001 | Tellado et al. | |
| 6,487,241 B1 | 11/2002 | Cole | |
| 6,512,797 B1 | 1/2003 | Tellado et al. | |
| 6,549,512 B2 | 4/2003 | Wu et al. | |
| 6,845,082 B2 * | 1/2005 | Bourget et al. | 370/210 |
| 7,103,097 B1 * | 9/2006 | Duvaut et al. | 375/222 |
| 7,136,423 B1 * | 11/2006 | Duvaut et al. | 375/260 |
| 7,292,639 B1 | 11/2007 | Demirekler | |
| 7,340,006 B2 | 3/2008 | Yun et al. | |
| 7,397,860 B1 * | 7/2008 | Duvaut et al. | 375/260 |
| 7,602,697 B2 * | 10/2009 | Kowalski | 370/208 |
| 7,822,131 B2 * | 10/2010 | Chen et al. | 375/260 |
| 7,974,181 B2 * | 7/2011 | Mahadevan et al. | 370/210 |
| 2002/0061068 A1 | 5/2002 | Leva et al. | |

(Continued)

FOREIGN PATENT DOCUMENTS

EP 1515504 5/2008

OTHER PUBLICATIONS

Wang et al., A Low-Complexity Peak-to-Average Power Technique for OFDM-Based Systems, 2004, Vehicular Technology Conference, 2004. VTC2004-Fall. 2004 IEEE 60th, vol. 6, pp. 4380-4384.*

(Continued)

*Primary Examiner* — Lawrence B Williams
(74) *Attorney, Agent, or Firm* — Mark J. Danielson; Pillsbury Winthrop Shaw Pittman LLP

(57) ABSTRACT

Systems and methods for reducing the peak-to-average ratio (PAR) at the transmitter can reduce the dynamic range required in various analog components. PAR can be reduced by applying a time-domain compensation signal which reduces the magnitude of peaks in the time-domain signal prior to transmission where the time-domain compensation signals use tones that are reserved for the purpose of reducing the PAR. The reservation of these reserved tones for PAR can be implemented by altering the typical startup procedures in a digital subscriber line (xDSL) system. The use of the reserved tones to reduce the PAR can be implemented using a low complexity algorithm or using an adaptive technique.

20 Claims, 27 Drawing Sheets

U.S. PATENT DOCUMENTS

| | | | |
|---|---|---|---|
| 2002/0080867 A1 | 6/2002 | Abbas et al. | |
| 2005/0018702 A1* | 1/2005 | Chen et al. | 370/431 |
| 2005/0157812 A1 | 7/2005 | Liu et al. | |
| 2005/0227218 A1 | 10/2005 | Mehta et al. | |
| 2006/0274893 A1 | 12/2006 | Cioffi et al. | |
| 2007/0071120 A1* | 3/2007 | Talwar | 375/260 |
| 2007/0116142 A1 | 5/2007 | Molander | |
| 2007/0217329 A1 | 9/2007 | Abedi | |
| 2008/0043616 A1* | 2/2008 | Clausen et al. | 370/210 |
| 2008/0159421 A1 | 7/2008 | Chen et al. | |
| 2008/0159422 A1 | 7/2008 | Chen et al. | |
| 2008/0181333 A1 | 7/2008 | Jiang | |
| 2008/0292010 A1 | 11/2008 | Wernears | |
| 2008/0310296 A1 | 12/2008 | Mahadevan et al. | |
| 2009/0080556 A1* | 3/2009 | Duan et al. | 375/262 |
| 2009/0176466 A1 | 7/2009 | Hellberg et al. | |
| 2009/0180574 A1 | 7/2009 | Futagi et al. | |
| 2009/0303097 A1 | 12/2009 | Reams et al. | |
| 2009/0304097 A1* | 12/2009 | Han et al. | 375/260 |
| 2009/0310658 A1* | 12/2009 | Garg et al. | 375/222 |
| 2009/0310659 A1 | 12/2009 | Garg et al. | |
| 2009/0310704 A1* | 12/2009 | Jethanandani et al. | 375/296 |
| 2010/0008442 A1* | 1/2010 | Hellberg | 375/267 |
| 2010/0029347 A1 | 2/2010 | Hellberg | |
| 2010/0067461 A1 | 3/2010 | Kwak et al. | |
| 2010/0110875 A1* | 5/2010 | No et al. | 370/210 |
| 2010/0177847 A1 | 7/2010 | Woodward | |
| 2011/0158336 A1* | 6/2011 | Jiang | 375/260 |

OTHER PUBLICATIONS

Bae et al., Robust Peak-to-Average Ratio Reduction in OFDM with Adaptive Clipping Control, 2007, Signals, Systems and Computers, 2007. ACSSC 2007. Conference Record of the Forty-First Asilomar Conference on, pp. 1738-1742.*

Hernandez et al., User Reservation Approach for Peak-To-Average Power Ratio Reduction in MC-CDMA Systems, Vehicular Technology Conference, 2009. VTC Spring 2009. IEEE 69th, pp. 1-5.*

Sung-Eun Park, et al., "Tone Reservation method for PAPR Reduction scheme", submission to IEEE 802.16 Broadband Wireless Access Working Group, Oct. 31, 2001, pp. 0-6.

Niklas Andgart, et al., "Designing Tone Reservation PAR Reduction", EURASIP Journal on Applied Signal Processing, Jan. 2006, pp. 1-14, vol. 2006, Hindawi Publishing Corp., New York, NY.

Niklas Andgart, et al., "PSD-Constrained PAR Reduction for DMT/OFDM", EURASIP Journal on Applied Signal Processing, Jan. 2004, pp. 1498-1507, vol. 2004, Hindawi Publishing Corp., New York, NY.

J.S. Chow, et al., "Mitigating clipping noise in multi-carrier systems," 1997 IEEE International Conference on Communications. ICC 97. Jun. 8-12, 1997, pp. 715-719, vol. 2, IEEE, Montreal, Canada.

D.L. Jones, "Peak power reduction in OFDM and DMT via active channel modification," Conference Record of the Thirty-Third Asilomar Conference on Signals, Systems, and Computers, Oct. 24-27, 1999, pp. 1076-1079 vol. 2, IEEE, Pacific Grove, CA.

R. Van Nee, "Reducing the peak-to-average power ratio of OFDM," 48th IEEE Vehicular Technology Conference, 1998. VTC 98, May 18-21, 1998, pp. 2072-2076 vol. 3, IEEE, Ottawa, Canada.

J. Tellado, et al., "PAR Reduction in Multicarrier Transmission Systems," Feb. 9, 1998.

J. Tellado, et al., "Revisiting DMT's PAR," Feb. 28, 1998.

International Search Report issued on Aug. 10, 2009 in PCT Application No. PCT/US2009/046338.

International Search Report issued on Oct. 6, 2009 in PCT Application No. PCT/US2009/046340.

Dick, C. et al., "FPGA Realization of Peak-to-Average Power Ratio Reduction Techniques for OFDM Wireless Systems", 2007, Signals, Sys., and Computers, ACSSC 2007, Conf. Record of the 41st Asilomar Conf., pp. 1969-1975.

Ernelli, M., "Loop Qualification for VDSL2", Master's Degree Project, Stockholm, Sweden, Apr. 2008, XR-EE-KT 2008:3, 77 pgs.

Palm, S., Courtesy Copy of G.dmt (AB-007R5-nc), T1E1.4:ADSL, Aug. 31-Sep. 4, 1998, 240 pgs.

Papandreou, N. et al., "ADSL Binder Modeling: Signaling and Data Transmission", The Nordic MATLAB Conf. 2003—NMC 2003, 7 pgs.

Wang et al., SPC08-1: "An Adaptive-Scaling Tone Reservation Algorithm for PAR Reduction in OFDM Systems", Global Telecommunications Conference, 2006, IEEE GLOBECOM 2006, 5 pgs.

Lim, et al., "Near Optimal PRT Set Selection Algorithm for Tone Reservation in OFDM Systems", IEEE Transactions on Broadcasting, vol. 54, No. 3, Sep. 2008, pp. 454-460.

* cited by examiner

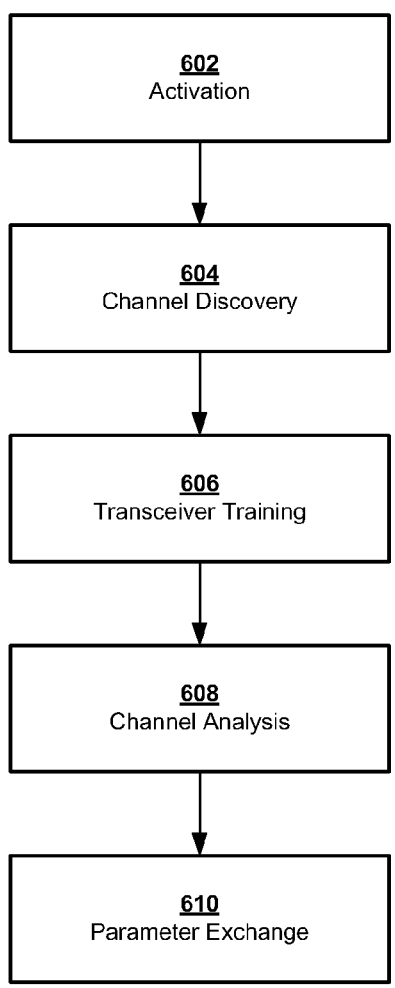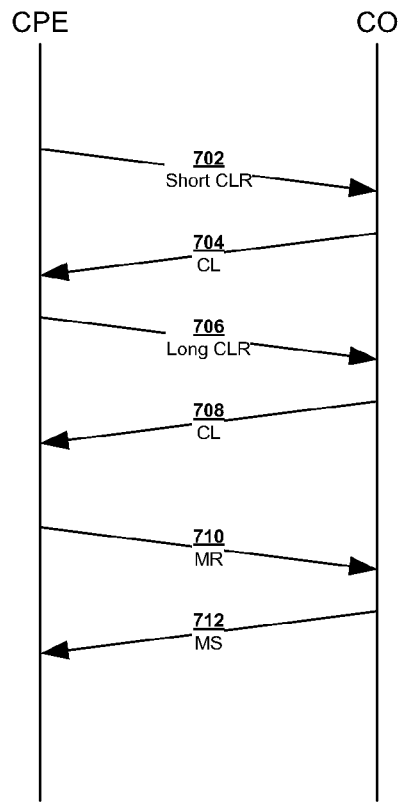
FIG. 7
FIG. 6

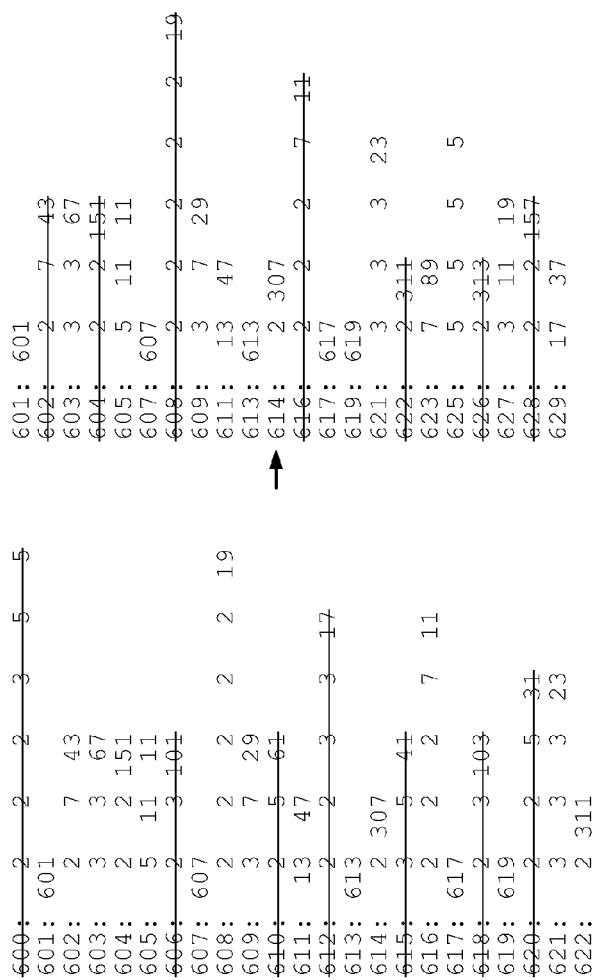
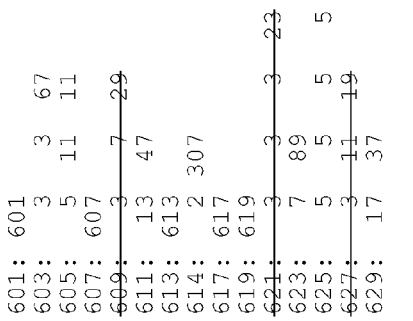
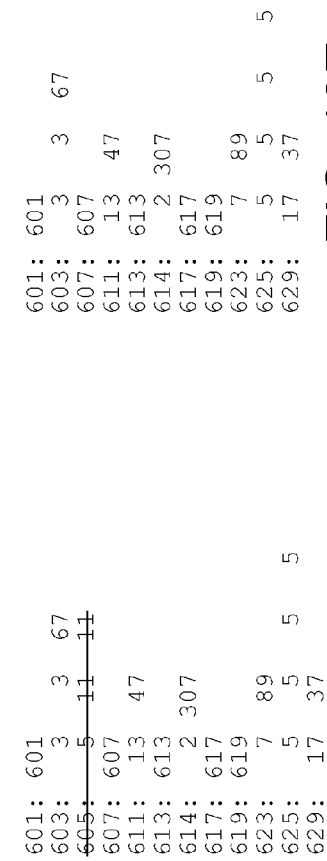
FIG. 19A
FIG. 19B
FIG. 19C
FIG. 19D
FIG. 19E 1.25 % reserved tones (20 tones): [537 656 387 352 380 239 310 766 615 189 1686 1642
1785 1728 1789 1587 1689 1273 1924 1811]

2.50 % reserved tones (40 tones): [537 276 656 701 387 173 352 625 380 73 239 827 310
588 766 397 615 211 189 512 1686 1436 1642 1293
1785 1399 1728 1865 1789 1660 1587 1401 1689 1788
1273 1461 1924 1416 1811 1965]

3.75 % reserved tones (60 tones): [659 757 842 53 38 605 641 360 247 105 68
431 385 756 517 140 146 639 498 773 568 175
174 349 403 369 184 607 185 566 1337 1218 1374
1651 1770 1662 1925 1816 1222 1644 1776 1275 1655
1631 1311 1429 1358 1262 1403 1431 1566 1410 1864
1791 1634 1248 1271 1367 1521 1602]

5.00 % reserved tones (80 tones): [537 495 276 629 656 296 701 290 387 210 173
635 352 223 625 87 380 277 73 190 239 300
27 771 310 33 588 611 766 38 397 790 615
763 211 193 189 556 512 103 1686 1429 1436
1355 1642 1443 1293 1934 1785 1445 1399 1868 1728
1777 1865 1534 1789 1227 1660 1240 1587 1214 1401
1780 1689 1820 1788 1675 1273 1626 1461 1695 1924
1876 1416 1871 1811 1388 1965 1319]

7.5 % reserved tones (120 tones): [659 814 757 826 842 65 53 249 38 284 605 348
641 285 360 690 247 654 105 262 68 866 431 650
385 680 756 423 517 155 140 87 146 278 639 608
498 169 773 827 568 97 175 316 174 509 349 570
403 528 369 281 184 716 607 95 185 556 566 630
1337 1691 1218 1595 1374 1552 1651 1409 1770 1322
1662 1917 1925 1436 1816 1821 1222 1585 1644 1407
1776 1564 1275 1927 1655 1729 1631 1594 1311 1794
1429 1251 1358 1832 1262 1766 1403 1842 1431 1548
1566 1415 1410 1921 1864 1809 1791 1335 1634 1421
1248 1491 1271 1910 1367 1702 1521 1256 1602 1279]

FIG. 29

ADAPTIVE TURBO PEAK MITIGATION FOR PEAK-TO-AVERAGE RATIO (PAR) REDUCTION USING RESERVED TONES

CROSS-REFERENCE TO RELATED APPLICATION

This application is related to commonly owned U.S. patent application entitled, "Systems and Methods for Positioning and Messaging of Reserved Tones for Peak-to-Average Ratio (PAR) Reduction in DSL Systems" having Ser. No. 12/138,657 filed on Jun. 13, 2008, which is hereby incorporated by reference in its entirety.

This application is also related to commonly owned U.S. patent application entitled, "Low Complexity Systems and Methods for Peak-to-Average Ratio (PAR) Reduction Using Reserved Tones" having Ser. No. 12/138,813, filed on Jun. 13, 2008, which is hereby incorporated by reference in its entirety.

BACKGROUND OF THE INVENTION

1. Field of the Invention

The invention relates to the reduction of peak-to-average ratio (PAR) for single-carrier and multi-carrier modulation schemes in digital subscriber lines.

2. Background Information

There are many technologies which impose high bandwidth applications over existing copper wire infrastructure intended for plain old telephones (POTS) communication, such as digital subscriber line (DSL) which comes in multiple variations such as asymmetric digital subscriber line (ADSL), high bit-rate digital subscriber line (HDSL), integrated services digital network (ISDN) digital subscriber line (IDSL), symmetric digital subscriber line (SDSL), Rate Adaptive Digital Subscriber Line (RADSL) and very high bit-rate digital subscriber line (VDSL), collectively known as xDSL. ADSL allows users a higher data rate downstream (i.e., to the customer) than upstream (i.e., to the service provider).

High-bandwidth systems, including DSL systems use single-carrier modulation as well as multi-carrier modulation schemes. Both DSL and other high-bandwidth systems such as wireless use modulation schemes such as Carrier-less Amplitude and Phase modulation (CAP) and Discrete Multi-tone (DMT) for wired media and Orthogonal Frequency Division Multiplexing (OFDM) for wireless communication. One advantage of such schemes is that they are suited for high-bandwidth application of 2 Mbps or higher upstream (subscriber to provider) and up to 8 Mbps downstream (provider to subscriber). Quadrature Amplitude Modulation (QAM) utilizes quadrature keying to encode more information on the same frequency by employing waves in the same frequency shifted by 90°, which can be thought of as sine and cosine waves of the same frequency. Since the sine and cosine waves are orthogonal, data can be encoded in the amplitudes of the sine and cosine waves. Therefore, twice as many bits can be sent over a single frequency using the quadrature keying. QAM modulation has been used in voice-band modem specifications, including the V.34.

CAP is similar to QAM. For transmission in each direction, CAP systems use two carriers of identical frequency above the 4 KHz voice band, one shifted 90° relative to the other. CAP also uses a constellation to encode bits at the transmitter and decode bits at the receiver. A constellation encoder maps a bit pattern of a known length to a sinusoid wave of a specified magnitude and phase. Conceptually, a sinusoidal wave can be viewed to be in one-to-one correspondence with a complex number where the phase of the sinusoidal is the argument (angle) of the complex number, and the magnitude of the sinusoidal wave is the magnitude of the complex number, which in turn can be represented as a point on a real-imaginary plane. Points on the real-imaginary plane can have bit patterns associated with them, and this is referred to as a constellation and is known to one of ordinary skill in the art.

DMT modulation, sometimes called OFDM, builds on some of the ideas of QAM but, unlike QAM, it uses more than one constellation encoder where each encoder receives a set of bits that are encoded and outputs sinusoid waves of varying magnitudes and phases. However, different frequencies are used for each constellation encoder. The outputs from these different encoders are summed together and sent over a single channel for each direction of transmission. For example, common DMT systems divide the spectrum above the 4-kHz voice frequency band into 256 narrow channels called bins (sometimes referred to as tones, DMT tones or sub-channels). These bins are 4.3125 kHz wide. The waveforms in each bin are completely separable from one another. In order to maintain separability, the frequencies of the sinusoidal used in each bin should be multiples of a common frequency known as the fundamental frequency and in addition the symbol period $\tau$, must be a multiple of the period of the fundamental frequency or a multiple thereof. A sinusoid is often represented by a complex number. The association is based on the fact that every sinusoid can be represented as the real part of the function $ae^{j\omega t}$, where a is the complex number and $\omega$ is the frequency of the sinusoid. In accordance with the constellation encoder, the value of $a_0$ is determined by the data to be encoded and the constellation used. Suppose all the bins use frequencies that are a multiple of a fundamental frequency $\omega_0$. Then over N bins, the waveform to be encoded is $\Sigma_{n=1,\ldots,N} a_n e^{jn\omega_0 t}$, which is an equation easily implemented using an inverse Fast Fourier Transform (IFFT).

From a circuit standpoint, and in relation to discrete multi-tone modulation, the prior art shown in FIG. 1, is a transmitter side of a DMT transceiver. The transmitter accepts serial data which is then converted from serial to parallel form and to provide M signals, $n_0 \ldots n_M$ via a serial to parallel converter 10 (SP). The value of M depend on the standard adopted; for example, ADSL uses 256 tones (M=256), ADSL2+ uses 512 tones (M=512) and VDSL uses even more. The sequences are then passed on to a symbol-mapper 20 where each bit is assigned or mapped into one of N-complex (QAM) multi-level sub-symbols. The M symbols are complex-valued and are fed into an IFFT 30 which provides 2×M output real samples by taking the complex conjugates of the M samples. The parallel outputs of the IFFT are applied to parallel to serial converter 40 to provide a serial output signal. The output of parallel to serial converter 40 is applied to cyclic prefix block 40 which helps to make a channel circular so that equalization can occur more easily in the frequency-domain. The output of the cyclic prefix block is then upsampled and interpolated by up-sampler 60 and interpolator 70. The output is processed by a digital-to-analog converter (DAC) 80 which converts the discrete time signal into a continuous time signal.

High amplitude peaks in the composite time signal occur when the signals from the different tones add constructively. Compared to the average signal power, the instantaneous power of these peaks is high, and consequently, so is the PAR. These large peaks require a large dynamic range of the DAC and analog front end (AFE) which results in inefficient amplifiers with excessive power dissipation and expensive transceivers. To overcome the drawbacks of the high PAR, many solutions and techniques have been proposed, one of which is tone reservation method in which a pre-selected number of tones are set aside for PAR reduction. The signal transmitted in these tones is subtracted from the data signal thus reducing the PAR, but at a cost of increased complexity at the transmitter.

As an example of how different tones can add constructively, a simple example of a DMT system comprising 4 bins at frequencies 1, 2, 3 & 4 is shown. FIG. 2A shows a time-domain realization of the symbol (1,1,0,0). For the purposes of example here, the graphs show voltage plotted against time, but the y-axis could be any form of signal bearing quantity. The resultant form has a distinctive peak at time index 0. This peak is not necessarily characteristic of other symbols; for example, the symbol (1,j,0,0) does not exhibit such a characteristic peak as shown in FIG. 2B. Suppose the bin at frequency 4 is a reserved tone, the addition of the fourth tone at a power level of ¼ shows a reduction in the peak of the signal in FIG. 2A as shown in FIG. 2C. The receiver of this signal will nonetheless only interpret tones at frequencies 1, 2 and 3 for extracting data from the transmitter.

The use of reserve tones in PAR reduction poses many challenges including a tradeoff between amount of PAR reduction, data rate loss, complexity of implementation, standard compliance and interoperability. Accordingly, various needs exist in the industry to address the aforementioned deficiencies and inadequacies.

SUMMARY OF INVENTION

PAR can be reduced using an adaptive method. This method comprises the steps of mapping a portion of the data with the default label of the default set of PAR reduction tones (PRT) where the default label is mapped using PRT signally tones, generating a time-domain signal using an IFFT from the symbol generated by the mapper, and calculating the PAR of the time-domain signal, selecting a set of PRT from a plurality of sets. If this set is the default set, the time-domain signal can be transmitted using the default set of PRT to reduce PAR. However, if the set is not the default set, a new symbol is remapped avoiding the use of PRT reserved in the selected set of PRT and mapping the label of the selected set using the PRT signaling tones. A new time-domain signal is generated from the new symbol using an IFFT and this new time-domain signal is transmitted using the selected set of PRT for PAR reduction. Each set in the plurality of sets of PRT can represent a percentage of total tones. PAR statistics such as the maximum PAR or the percentage of time-domain samples exceeding a predetermined threshold can be used to select the appropriate set of PRT tones.

The method described above can be embodied into a system comprising a mapper configured to map data and a default label indicative of a default set of PRT tones to a symbol, an IFFT configured to convert the symbol to a time-domain signal, a PAR determination module coupled to the output of the IFFT, a PRT determination module coupled to the PAR determination module and configured to select a set of PRT from a predetermined plurality of sets of PRT based on the output of the PAR determination module, and a PAR reduction module coupled to the PRT determination module configured to reduce PAR based on the default set of PRT. In the event the default set of PRT is not selected, the system also comprises a second mapper coupled to the PRT determination module and configured to map a subset of the data and a label corresponding to a set of PRT selected by the PRT determination module into a second symbol, a second IFFT configured to convert the second symbol to a second time-domain signal; and a second PAR reduction module coupled to the second IFFT configured to reduce PAR based on the set of PRT.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 shows a typical sequence of training and calibration steps that take place;

FIG. 7 illustrates a typical message exchange that takes place during the handshake;

FIGS. 19A-19E show a specific example of how to derive relatively prime tones;

FIG. 29 is a collection of PRT sets used in the adaptive PAR reduction technique;

DETAILED DESCRIPTION

Figure 1:
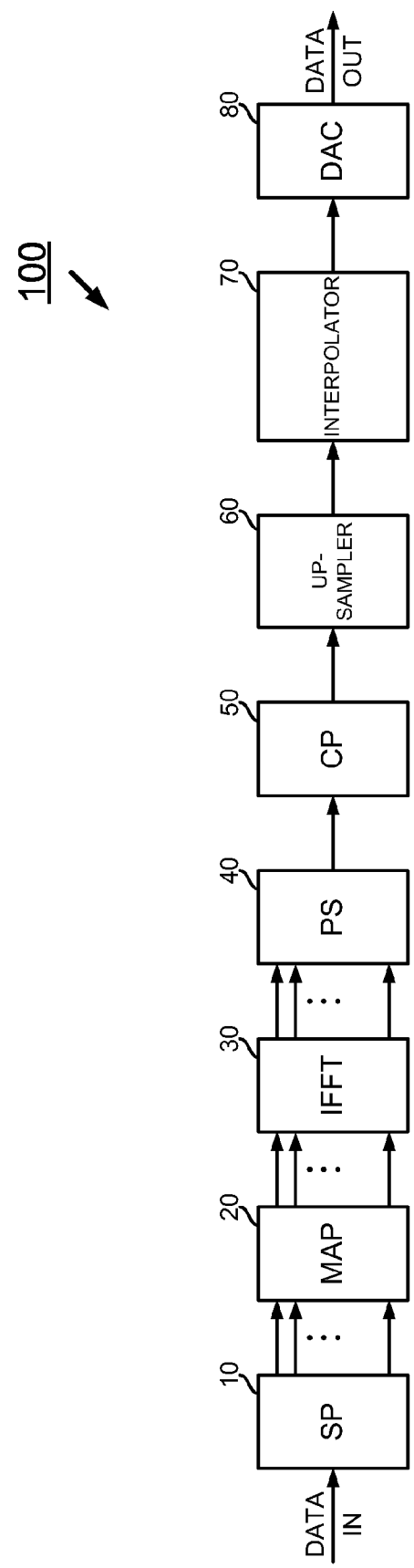
FIG. 1 shows the transmitter side of a DMT transceiver.

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As mentioned above, in the background section, the addition of reserved tones can be used to mitigate the peaks in order to reduce the PAR of the transmission of a particular symbol. While reserved tones for PAR reduction, known as PRT have been used in the past to construct a time-domain compensation signal, novel techniques are set forth in the following. There are two aspects to effective PAR reduction. The first aspect is the choice of the PRT. The second aspect is constructing the time-domain compensation signal once the PRT are reserved.

It should be noted that generally, the use of PRT is more applicable in the downstream direction from the Central Office (CO) to the customer premises equipment (CPE) especially in the asymmetric case, primarily because the downstream direction utilizes more tones; hence, is more likely to develop larger peaks and have more tones available to reserve as PRT. However, one of ordinary skill would recognize that the systems and methods described can be applicable to the upstream communications as well. Additionally, the systems described herein can as readily be implemented in hardware as circuits, hardware with firmware or software.

With regard to the first aspect, in order to avoid interference with tones allocated for data, PRT should be tones not used for data. There are several approaches to the reservation of tones. Out-band tones, which are tones lying outside the tones designated as usable by the data signal, can be used. These tones typically occupy the frequencies above the highest tone used for data signals. When the time-domain compensation signal for PAR reduction is applied immediately after the IFFT, the number of available out-band tones is dependent on the number of tones allowed by the IFFT size (which is half the IFFT size) and the highest tone used for data signals. Several xDSL systems may use the minimum required IFFT size (which is usually the smallest power of 2 higher than twice the highest tone used for the data signal) in order to limit the computational resources. For example, in ADSL2+ the highest used tone for downstream is tone 511. Consequently, an IFFT size of 1024 suffices, resulting in a complete absence of available out-band tones for PAR mitigation. The use of tones higher than half the IFFT size for generating the time-domain compensation signal immediately after the IFFT is not suitable since the signal on these tones interferes with the signal on tones at lower frequencies due to aliasing.

Out-band tones usually cannot be used to construct the time-domain compensation signal for performing PAR mitigation immediately after the IFFT in systems where the minimally required IFFT-size is used. Furthermore, such systems also usually employ time-domain oversampling techniques in order to increase the sampling rate before digital-to-analog conversion. The use of filters inherent in time-domain oversampling techniques results in an increase in the PAR of the signal due to the peak-regrowth phenomenon. Peak-regrowth can be easily understood if one realizes that filtering involves performing a linear combination of several time-samples at the input to the filter leading to the Gaussianization of the time-samples in the filtered signal. As the objective is maximal peak reduction prior to digital-to-analog conversion, we need to either apply the time-domain compensation signal after the time-domain oversampling operation, or altogether avoid time-domain oversampling operations.

A novel approach to implementing PAR reduction that can potentially avoid time-domain oversampling is to employ a frequency-domain oversampling technique, which also makes a large number of out-band tones available for PAR reduction. Frequency-domain oversampling involves the use of an IFFT of size $2^k N$, where N is the minimally required IFFT size and k is a small positive integer. In practice, k=1 is often used. With frequency-domain oversampling, all components down stream from the IFFT would have to accommodate the larger number of samples, thus requiring additional computational resources. By using this frequency-domain technique, out-band reserve tones can be used for PAR reduction, and the time-domain compensation signal can be added immediately after the IFFT without any fear of peak-regrowth since time-domain oversampling is not necessary, thanks to the already higher sampling rate achieved by frequency-domain oversampling. Fortunately, under several implementations of various xDSL systems, the receivers are already equipped to perform frequency-domain oversampling. For example, this approach is exhibited in some 4-band VDSL embodiments where an 8192-point IFFT is used but the highest loaded tone is 1971, which would only require a 4096-point IFFT. An oversampling factor of two times is common. In such a system, out-band signals of less than twice the highest frequencies supported by the IFFT size can be used as out-band reserve tones.

The alternative to out-band PRT is in-band PRT where some of the reserved tones occupy the tones normally used for transmitting data. However, by reserving in-band tones, there are fewer tones to carry data thereby reducing the data rate. There are a number of factors to be considered in the reservation of PRT. In order to minimize the impact on the data rate, it is desirable to reserve tones which have the least ability to carry data or suspected of being the least able. Often this corresponds to the highest frequency tones as those tones are more likely to encounter more attenuation. Since the transmission of a time-domain compensation signal is for the benefit of transmitter components, such as the DAC, it doesn't matter if the time-domain compensation signal is severely attenuated when it is received at the receiver as the receiver will disregard the signal. Another consideration in the reservation of PRT is to reserve tones that are suitable for constructing a time-domain compensation signal. For example, in some of the techniques described below, a base compensation signal is constructed first having a single large or predominant peak with secondary peaks made as small as possible. In the ideal case, an impulse is desirable, but an impulse would require contributions from all tones which would render all tones unavailable to carry data. So a compromise solution might be to reserve tones based on a uniformly random selection. Other methods of selecting the PRT can also be considered, but basically there are two types of tones that can be selected, the upper frequency tones and the in-medley tones.

Figure 3:
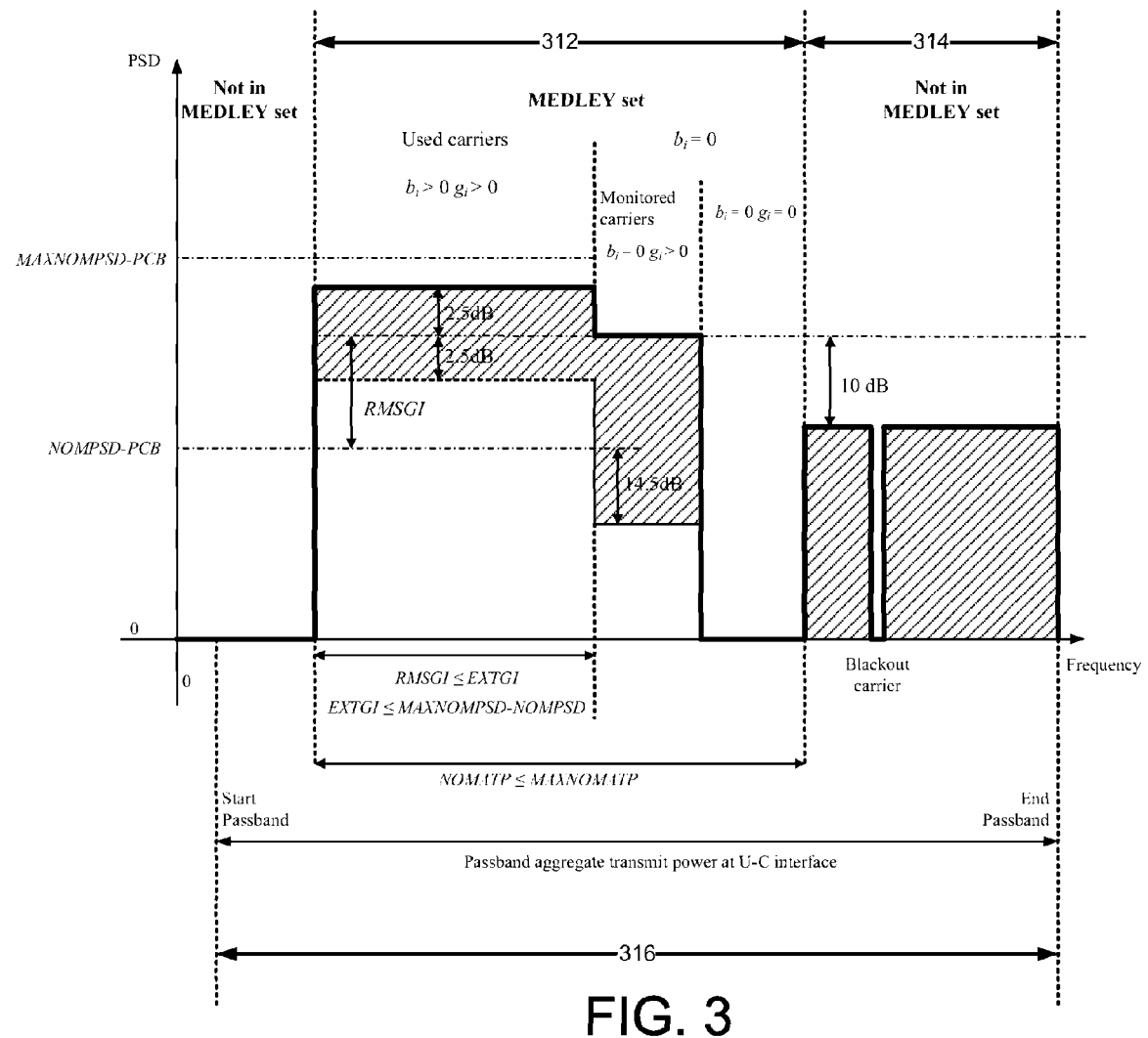
FIG. 3 shows an exemplary power spectrum for an xDSL transmission.

FIG. 3 shows an exemplary power spectrum for an xDSL transmission. The entire passband 316 for downstream xDSL communications is shown. The MEDLEY set 312 is a contiguous range of frequencies allocated for the transmission of data. The upper frequency band 314 is shown above the MEDLEY set. In order to comply with the standards the power spectral density (PSD) of tones lying outside the MEDLEY set must be at least 10 dB or an order of magnitude lower. There may be further constraints on the tones, for example, some tones are blacked out making them unusable. The upper frequency tones are selected from the upper frequency band. The in-medley tones are selected from within the MEDLEY set. According to many xDSL standards, any tone from the MEDLEY set not used for transmission of data must transmit a pseudo-random bit sequence (PRBS).

The use of upper frequency tones has advantages such as low impact on the overall data rate and standard compliance, but has disadvantages such as a poorer compensation signal and a forced 10 dB attenuation. However, the use of in-medley tones has advantages such as superior PAR reduction, but disadvantages such as standard non-compliance and greater impact on overall data rate.

In a typical startup sequence, during a handshake the transmitter sends a MEDLEY set, which is usually determined based on the attenuation each tone experiences. The attenuation can be derived from estimating the loop length and using a look up table to estimate the rate loss. If the rate loss is too great, the tone is unusable and will not be used in the MEDLEY set. After the MEDLEY set is transmitted, power levels are measured for each tone in the MEDLEY set. Based on the power levels received, the receiver can determine how many bits per tone (notated as $b_i$) each tone can carry. Once the transmitter and receiver have agreed on the number of bits per tone, the startup sequence is complete and the transmitter sends data on each tone in the MEDLEY set in accordance with a predetermined constellation for the number of bits available.

Figure 4:
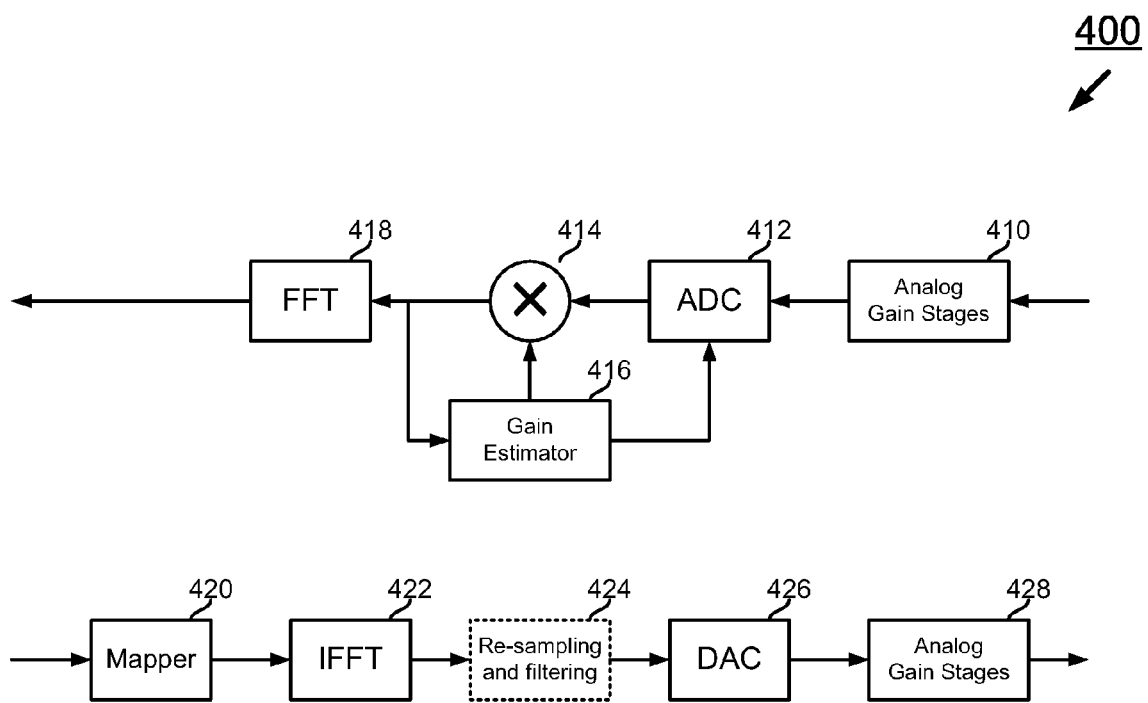
FIG. 4 shows a simplified diagram of a typical DMT transceiver.

FIG. 4 shows a typical DMT transceiver. A signal is received by analog gain stages 410 which can comprise a set of amplifiers and filters known to one of ordinary skill. The appropriately conditioned signal is then received by ADC 412, which digitizes the signal. Digital gain control 414 is a scaler which scales the digital value for the optimum utilization of the dynamic range offered by the finite-precision representation of the digital values. Gain estimator 416 is used to adjust the dynamic range of the incoming signal. Based on the estimated gain, the dynamic range experienced by ADC 412 can be adjusted by adjusting the gain in analog gain stages 410. Additionally, gain estimator 416 can supply the gain value for digital gain control 414 to scale the digitized signal. Finally, the digital signal is then converted to its constituent symbols with FFT 418. On the transmit side, the system is essentially the same as that shown in FIG. 1. For clarity, some of the components are removed. Basically, mapper 420 converts symbols into their appropriate complex values according to the appropriate constellation. The series of complex values are converted to a time-domain digital signal by IFFT 422. Optionally, the time-domain digital may by re-sampled and filtered by module 424, after which it is converted to an analog signal by DAC 426. The signal is then conditioned for output by analog gain stages 428 which can comprise filters, amplifiers and other components known to one of ordinary skill in the art.

Figure 5:
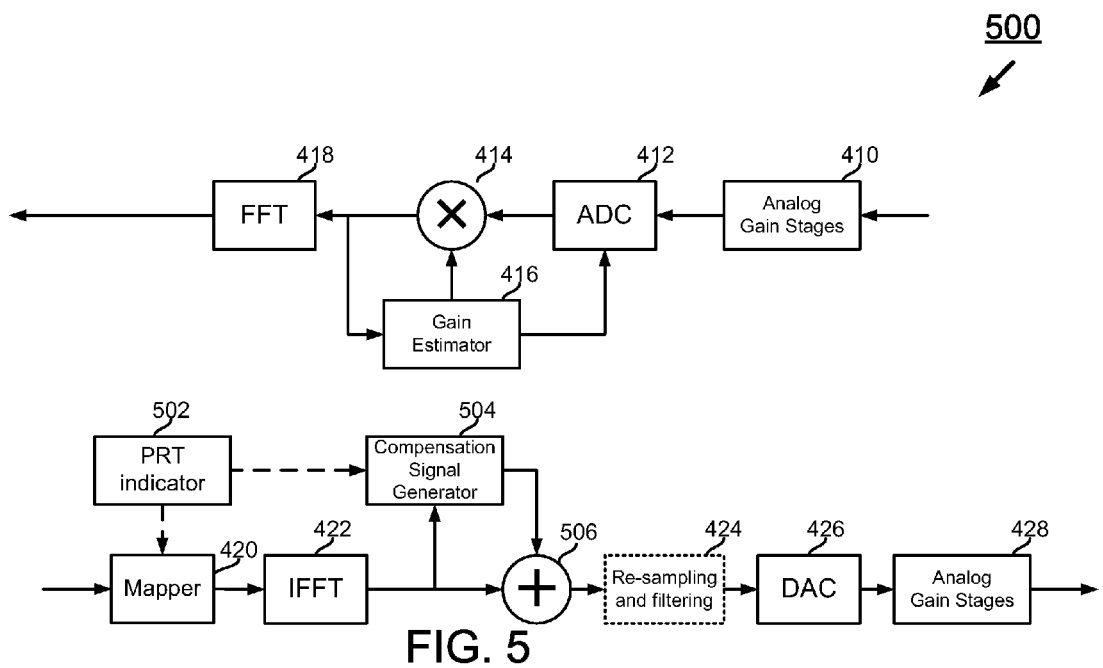
FIG. 5 shows a typical DMT transceiver equipped with PRT PAR reduction.

FIG. 5 shows a typical DMT transceiver equipped with PRT PAR reduction. The components are similar to their counterparts in FIG. 4. PRT indicator 502 is added which controls mapper 420 by limiting the tones used for data to the non-reserved tones. Furthermore, PRT indicator 502 indicates to compensation signal generator 504, the tones reserved for use in generating a time-domain compensation signal. These control paths are indicated by dashed lines. Compensation signal generator 504, which generates the time-domain compensation signal based on the output of the IFFT 422 by using mapper 420 and converting the signal in the reserved tones to the time-domain with IFFT 422. In an alternate embodiment these could be separate hardware or software units, but in practice they can be the same hardware/software reused for generating the time compensation signal. Finally, the time-domain compensation signal is added to the data signal using mixer 506.

Depending on the different requirements of startup time, standard compliance, rate loss and desired PAR gain, different startup sequences can be employed in different embodiments. Eight embodiments of the system illustrating eight different methods of starting up an xDSL communications are described. Each embodiment has advantages and disadvantage with respect to standard compliance, rate loss, and desired PAR gain.

FIG. 6 shows a typical sequence of training and calibration steps that take place. A startup begins with activation stage 602 which typically includes a handshake. This is followed by channel discovery stage 604. The startup continues next with transceiver training phase 606 where automatic gain control (AGC) settings, equalizers and echo cancellers are trained. During this phase, the MEDLEY set can be predetermined or can be selected based on channel measurements and the lowest bits-per-tone. This is followed by channel analysis phase 608 where channels are identified, noise is estimated and bit allocation is made. Finally, framing and coding parameters are exchanged during parameter exchange phase 610.

FIG. 7 illustrates a typical message exchange that takes place during the handshake. The handshake is typically initiated by the CPE by sending capabilities list/request (CLR) message 702 having the capabilities list without containing any parameter information. Such a CLR message is henceforth referred to as "a short CLR" message. This message advertises the supported modes by the CPE and requests a capabilities list (CL) from the CO. The CO responds with CL message 704, which conveys the possible modes of the CO. The handshake continues with a "long CLR" message 706 which contain all the capabilities with their parameters. The CO responds with CL message 708. The CPE then sends mode request (MR) message 710 which solicits mode select (MS) message 712. The MS message selects the mode of operation.

Figure 8:
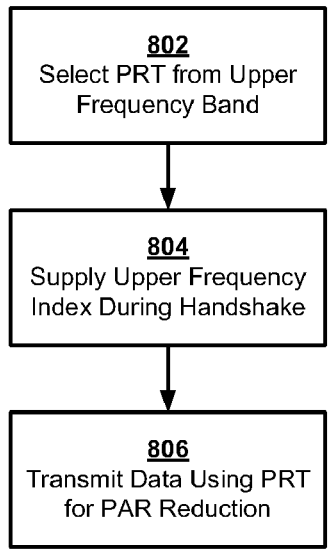
FIG. 8 is a flow chart in accordance with the first embodiment.

FIG. 8 is a flow chart in accordance with the first embodiment. This system and method is completely standard compliant and essentially reserves only upper frequency tones as PRT and uses system 500. Specifically, at step 802, the PRT are selected from the upper frequency band. At step 804, during the handshake the upper frequency index for the supported set including the PRT is specified. As the MEDLEY set is a subset of the supported set, this specifies the upper frequency of the MEDLEY set. At step 806, PAR reduction can begin with PRT selected from the upper frequency band subject to the power restrictions set forth in the standard.

Figure 9:
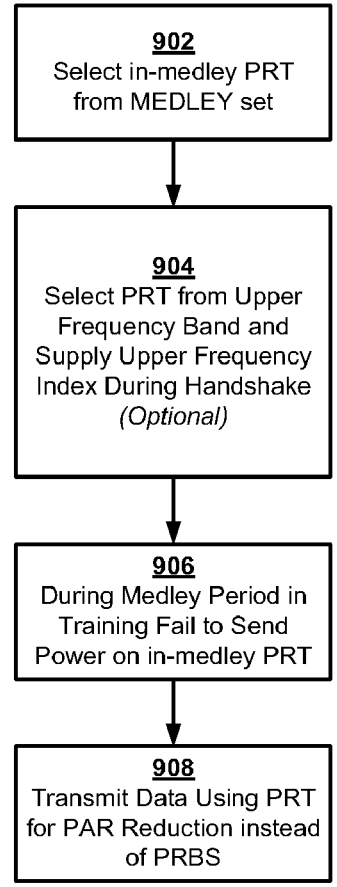
FIG. 9 is a flow chart in accordance with the second embodiment.

FIG. 9 is a flow chart in accordance with the second embodiment. This system and method is not completely standard compliant but is interoperable, that is a standard compliant receiver can still operate with system 400. In this embodiment, in-medley tones are selected as PRT and optionally, upper frequency tones are selected as PRT. Specifically, at step 902, in-medley tones are selected from tones in the MEDLEY set, these may be selected in a number of ways including at random. Optionally at step 902, upper frequency tones can also be selected in the upper frequency band similar to step 802 above. If optional upper frequency band tones are used, at step 904 the upper frequency index for the supported set is specified to include the PRT in the upper frequency band similar to step 904 above. At step 906, during the medley period in training, the transmitter does not send any power to the selected in-medley tones. Normally, during the medley period in training, the transmitter transmits power on each of the tones in the medley set. The receiver receives the training signal and based on the power received determines the number of bits that can be transmitted on that tone. If during this period, the transmitter deliberately fails to transmit power on selected tones, the receiver will set $b_i=0$ for that given tone. In effect, the transmitter tricks the receiver into thinking that no data can be transmitted on a given tone. Finally, at step 908 instead of sending a PRBS in the in-medley tones as is normally sent, the in-medley tones and the upper frequency band tones are used for PAR reduction. According to many xDSL standards, any tones within the MEDLEY set that do not transmit data must transmit a PRBS. Since the receiver does not receive data on these channels, it does not require PRBS to be received on those tones for which $b_i=0$. As a result, a transmitter transmitting something other than a PRBS on those tones in the MEDLEY set for which $b_i=0$ will be interoperable with a standard compliant receiver even though the transmitter is no longer standard compliant.

Figure 10:
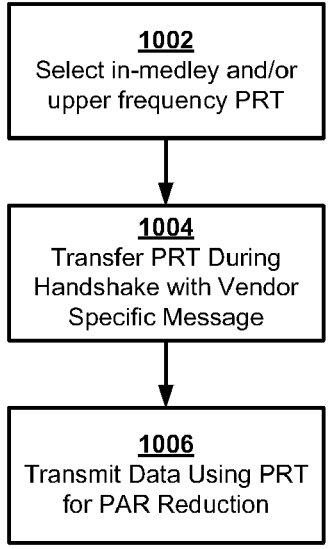
FIG. 10 is a flow chart in accordance with the third embodiment.

FIG. 10 is a flow chart in accordance with the third embodiment. This system and method uses a vendor specific message to transmit which PRT are reserved and uses system 500. In this embodiment the PRT can comprise either in-medley tones or upper frequency tones. At step 1002, the PRT are selected and can be selected from random in-band tones. At step 1004, during the handshake, a vendor specific information is sent transferring the identity of the PRTs being used. The information is sent using the non-standard field, which can be vendor discretionary (as specified in the standards such as G.994.1). The transmitter communicates this either with a CL or a MS message to the receiver. The receiver confirms the capability of acceptance of the PRT using a CLR message. At step 1006, the PRT are used for PAR reduction. The disadvantage of this technique is that the receiver must be capable of deciphering the vendor specific message so as to disregard the information that arrives in the PRT.

Figure 11:
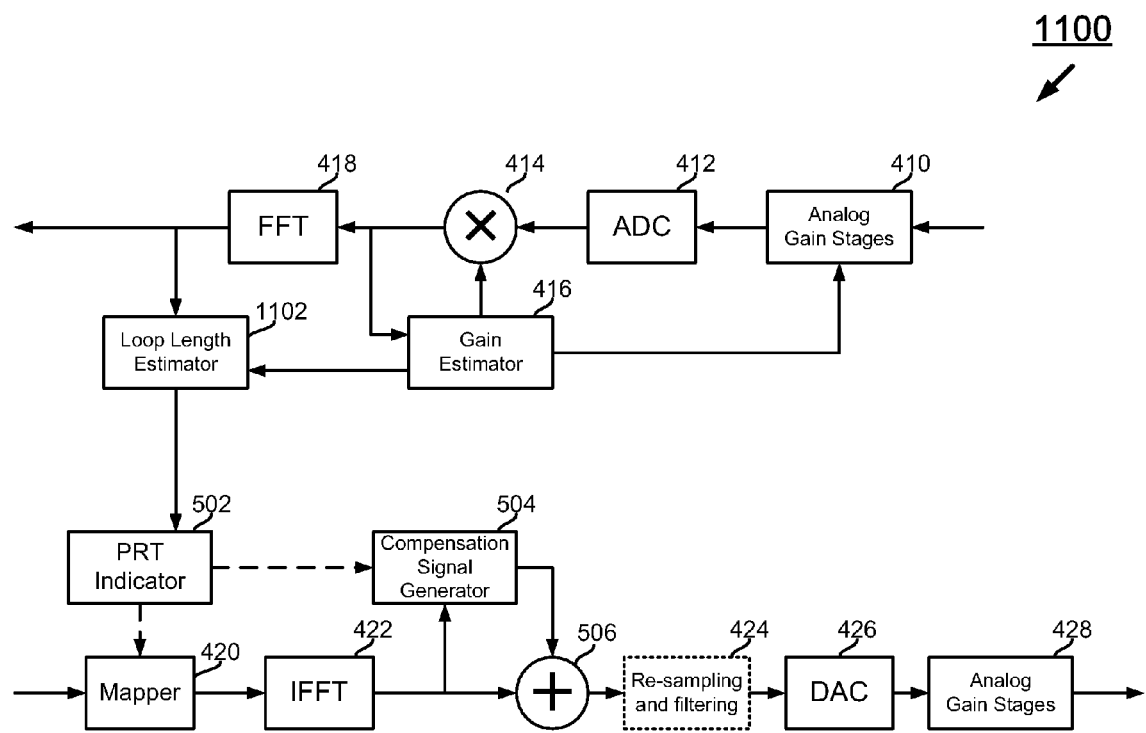
FIG. 11 shows a schematic of a DMT transceiver using a loop length estimator for PRT selection.

FIG. 11 shows a schematic of a DMT transceiver using a loop length estimator for PRT selection. The components of system 1100 are similar to their counterparts in system 500 in FIG. 5. System 1100 additionally comprises loop length estimator 1102. Based on the result of estimated loop length, a set of allowed tones can be supplied to PRT indicator 502 through a lookup table. PRT indicator 502 can then select the PRT based on the target rate lost and desired PAR reduction by selecting those tones based on the lookup table that can support either little or no data traffic due to anticipated attenuation of the tones in the transmission line.

Figure 12:
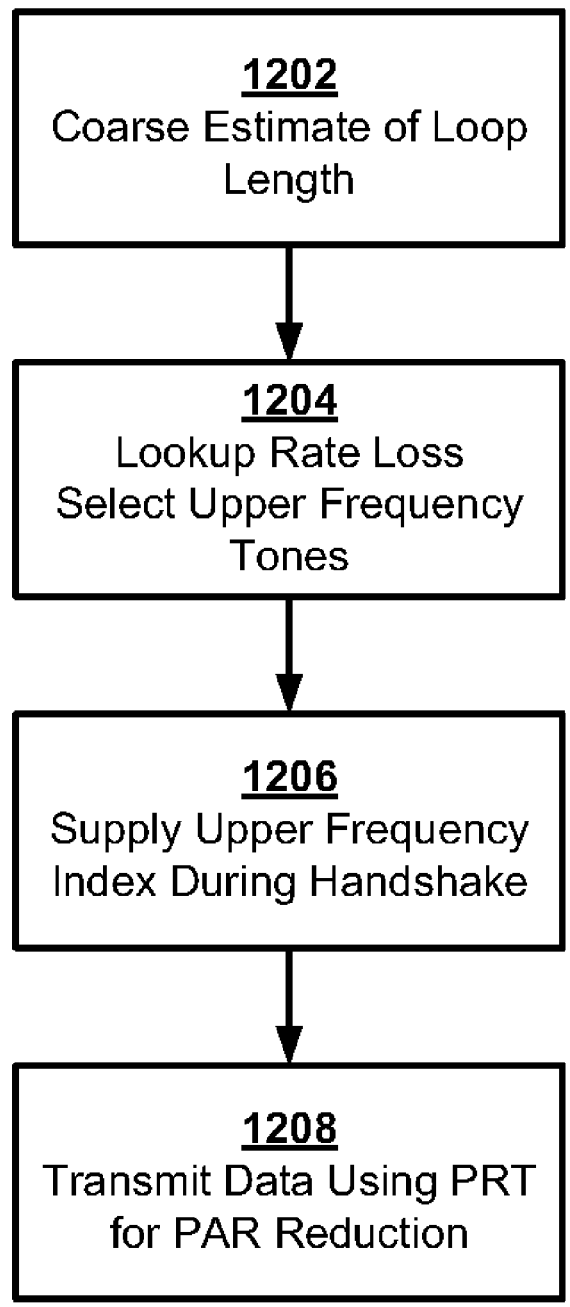
FIG. 12 is a flow chart in accordance with the fourth embodiment.

FIG. 12 is a flow chart in accordance with the fourth embodiment and uses system 1100. This system and method is completely standard compliant and essentially reserves only upper frequency tones as PRT. The system and method is similar to that of FIG. 8 except that the selection of the upper frequency is less arbitrary and based on information related to the estimate of the coarse loop length. More specifically, at step 1202, an estimate of the coarse loop length is derived during the handshake process. For example, one method is to use the channel response Management Information Base parameter (Hlog MIB) which is used to calculate the channel attenuation. The attenuation can be used to roughly estimate loop length. At step 1204, the estimated loop length is used to estimate the rate loss of each tone by looking up the rate loss in a lookup table. The values in the lookup table can be preloaded based on established values or can be derived by keeping track of the history of rate loss based on the various loop lengths encountered. In the former case, the values could be established by the manufacturer in a test environment such as measurements in a laboratory setting. In the latter case, each time a transmitter communicates with a receiver the rate loss of each tone can be recorded into a lookup table as a function of loop length. At step 1206, upper frequency tones can be reserved. Based on the desired rate loss and estimated number of tones required for PAR reduction, the upper frequency index can be selected to best accommodate these two factors. This upper frequency index is transmitted during the handshake message much as step 804 for system 500. The result is the MEDLEY set is specified to exclude the reserved upper frequency tones. At step 1208, PAR reduction can begin with PRT selected from the upper frequency band subject to the power restrictions set forth in the standard.

Figure 13:
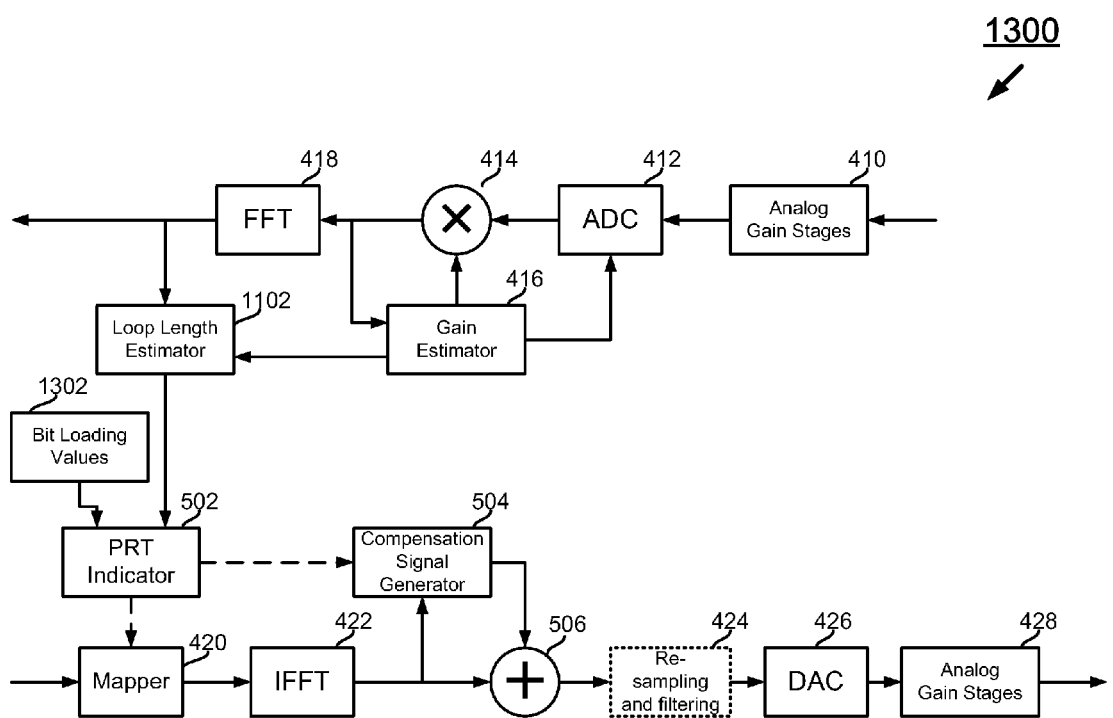
FIG. 13 is a schematic of a DMT transceiver using a bit loading for PRT selection.

FIG. 13 is a schematic of a DMT transceiver using a bit loading for PRT selection. The components of system 1300 are similar to their counterparts in system 500 in FIG. 5 and system 1100 in FIG. 11. System 1300 additionally comprises bit loading module 1302. Bit loading module supplies the estimated bits per tone $b_i$. The estimated bits per tone can then used by PAR tone indicator 1102 to select the PRT. One difficulty in using this approach is that the estimated bits per tone are not determined until after the reservation of the PRT takes place in the normal startup sequence. In order to employ the bits per tone information into the selection of PRT, upon the initial startup of communications between the transmitter and the receiver, the startup sequence is allowed to proceed until the estimate of the bits per tone is determined and sent to the other side. At this time the current startup sequence is aborted and a new startup is initiated.

Figure 14:
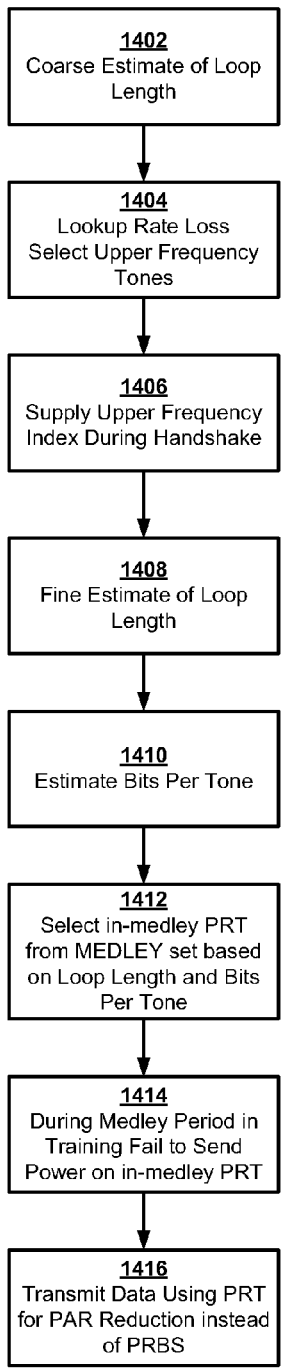
FIG. 14 is a flow chart in accordance with the fifth embodiment.

FIG. 14 is a flow chart in accordance with the fifth embodiment and uses system 1100. The systems and methods employ in-medley tones and optionally upper frequency tones for PAR reduction and are interoperable with standard compliant receivers. For completeness, the method illustrated in FIG. 14 includes the optional use of upper frequency tones. It is clear that certain steps can be eliminated if the use of upper frequency tones is not desired. Specifically, at step 1402, an estimate of the coarse loop length is derived during the handshake process much in the same way as step 1202 described above. At step 1404, like step 1204 the rate loss is derived from the coarse loop length through a lookup table. Based on the rate loss and estimated number of tones required for PAR reduction, the upper frequency tones for PAR reduction can be selected. At step 1406, like step 1206, the upper frequency tones are reserved. At step 1408, a fine loop length is estimated. Unlike the coarse loop length estimate, which is obtained using information obtained during handshake or the channel discovery phase, the fine loop length is estimated from information derived in the transceiver training phase but prior to the medley period. At step 1410, the expected number of bits per tone is estimated based on the fine loop length. This estimate can be based on looking up an expected number of bits per tone in a lookup table or a simple calculation. The lookup table can be preloaded or derived based on history in a way similar to the rate loss table as related to the coarse loop length. As described below, the bits per tone are eventually determined during the channel analysis phase, but since the bits per tone are needed prior to the medley period, an expected bits per tone value is used instead. At step 1412, in-medley PAR tones are selected based on the fine loop length and expected bits per tone. This too can be selected using a lookup table. At step 1414, during the medley period in the training, no power on the selected in-medley tones is transmitted in a way similar to step 906. At step 1416, time-domain compensation signals are transmitted in the in-medley tones rather than a PRBS as specified by the standard in a manner similar to step 908.

Figure 15:
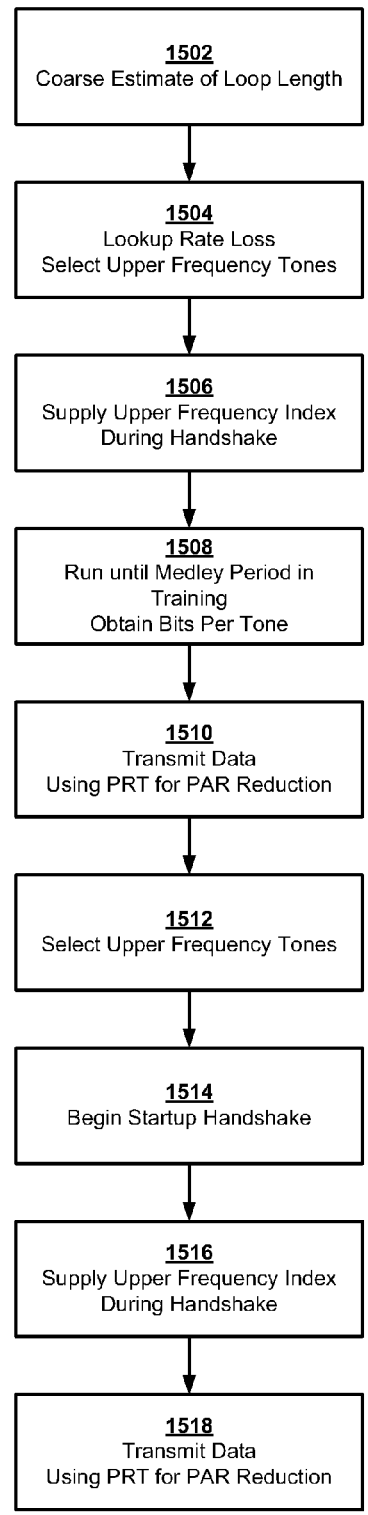
FIG. 15 is a flow chart in accordance with the sixth embodiment.

FIG. 15 is a flow chart in accordance with the sixth embodiment and uses system 1300. The systems and methods are completely standard compliant and essentially reserve only upper frequency tones as PRT while using two startup sequences. During the first start up it obtains bit loading information obtained during the channel analysis phase to refine the MEDLEY set. During the second start up the system reserves PRT based on the bit loading information obtained in the first start up. Specifically, steps 1502, 1504, and 1506 are similar to steps 1202, 1204, and 1206 in FIG. 12. At step 1508, the startup sequence continues at least until after the medley period in training completes and the number of bits per tone is determined by the receiver and transmitted to the transmitter. At step 1510, system 1300 may be permitted to run under the coarse estimation using the initial upper frequency tones selected as PRT similar to step 1208 in FIG. 12. At any time after the determination of the number of bits per tone is received by the transmitter, the transmitter can start up again. Before that at step 1512, based on the target rate loss and the desired PAR reduction, the number of tones to be reserved for PRT can be estimated based on the bits per tone information. This is a refinement of the number of tones derived in step 1504. At step 1514, the transmitter begins the startup again from the handshake. At step 1516, based on the new estimate of the number of tones required, a new upper frequency index is selected and hence a new MEDLEY set and transmitted during the handshake message. At step 1518, the upper frequency tones reserved as PRT are employed in PAR reduction. In an alternative embodiment, if the number of tones initially selected based on the coarse estimation is adequate, the current PRT tones are retained and there is no need for a second startup.

Figure 16:
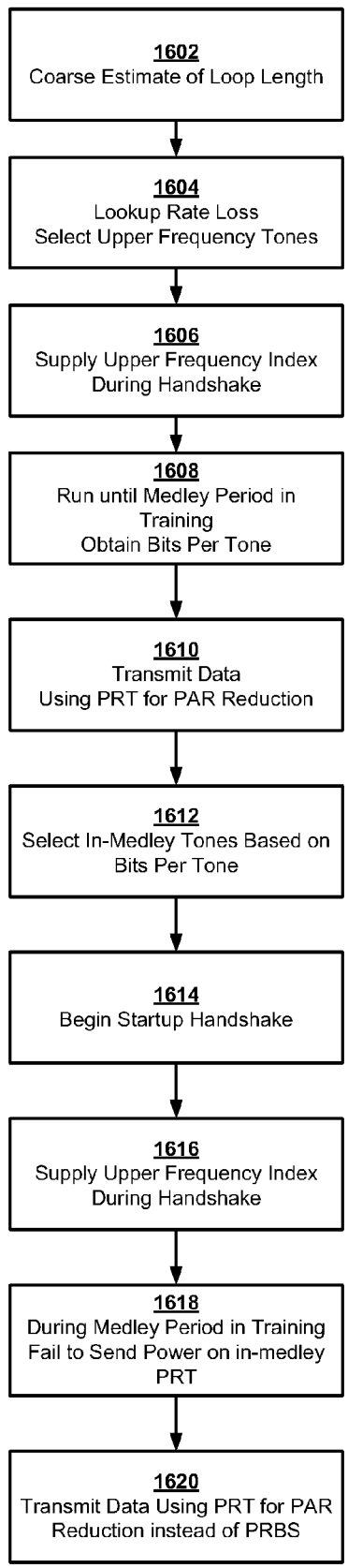
FIG. 16 is a flow chart in accordance with the seventh embodiment.

FIG. 16 is a flow chart in accordance with the seventh embodiment and uses system 1300. The systems and methods use coarse loop length to select the upper frequency tones and bit loading information to select in-medley tones. Specifically, steps 1602, 1604, and 1606 are similar to steps 1202, 1204, and 1206 in FIG. 12. Steps 1608 and 1610 are similar to steps 1508 and 1510. In this embodiment, if upper frequency tones are not used, steps 1602, 1604, 1606 and 1610 can be skipped. Whether upper frequency tones are used or not, the startup sequence continues at least until after the medley period in training completes and the number of bits per tone is determined by the receiver and transmitted to the transmitter. At step 1612 based on the target rate loss and the desired PAR reduction, the number of tones to be reserved for PRT can be determined from the bits per tone information. In this step, in-medley tones can be selected based on desired PAR reduction characteristics of each tone and the number of bits each tone can carry in order to minimize the impact on the data rate lost for such a selection. At step 1614, the transmitter begins the startup again from the handshake. Optionally, at step 1616, a new MEDLEY set can be derived and a new upper frequency index can be transmitted during the handshake message similar to step 1516. At step 1618, during the medley period in training, no power is transmitted over the selected in-medley tones similar to that described for step 906 in FIG. 9. Communications using PAR reduction similar to that described in step 908 in FIG. 9 can take place in step 1620.

Figure 17:
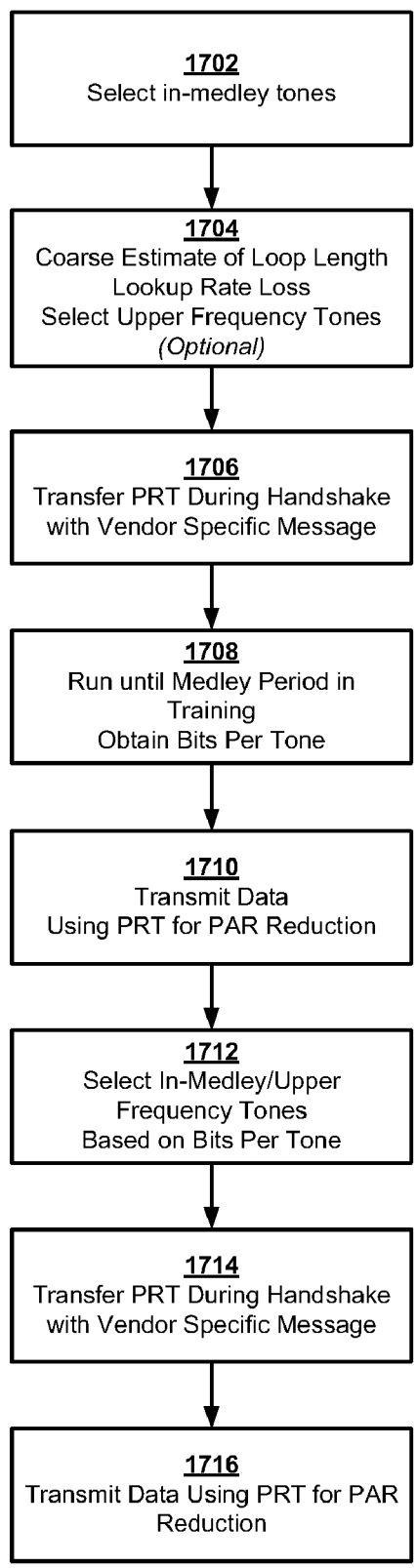
FIG. 17 is a flow chart in accordance with the eighth embodiment.

FIG. 17 is a flow chart in accordance with the eighth embodiment and uses system 1300. The systems and methods use coarse loop length to select the upper frequency tones and bit loading information to select in-medley tones. Specifically, at step 1702, a default number of tones are selected with a predetermined set of in-medley tones. At step 1704, optionally, upper frequency tones can be selected based on the coarse loop length similar to that of step 1202 of FIG. 12. At step 1706, during the handshake message a vendor specific message is sent transferring the PRTs being used, similar to step 1004 of FIG. 10. Steps 1708 and 1710 are similar to steps 1508 and 1510. The startup sequence continues at least until after the medley period in training completes and the number of bits per tone is determined by the receiver and transmitted to the transmitter. At step 1712 based on the target rate loss and the desired PAR reduction, the number of tones to be reserved for PRT can be determined from the bits per tone information. In this step, in-medley tones can be selected based on desired PAR reduction characteristics of each tone and the number of bits each tone can carry in order to minimize the impact on the data rate lost for such a selection. Additionally, the MEDLEY can be optionally modified according to this information. At step 1714, having selected a new set of PRT with in-medley tones and optionally upper frequency tones, a vendor specific message is sent transferring the new PRTs being used, similar to step 1706. At step 1716, the PRT are used for PAR reduction.

While this embodiment is neither interoperable nor compliant, it affords additional optimization during the startup. However, since optimization in the handshake need not be performed a second time, the CPE recognizing the vendor specific message upon initiation of the second start up could jump ahead and send a long CLR message (see long CLR message 706 of FIG. 7). Alternatively, the CPE can also jump ahead and send an MR message (see MR message 710 of FIG. 7) eliminating the need to transmit the CLR/CL message sequences. As supported by the standard, unlike described in FIG. 7, the CPE rather than the CO can select the mode by transmitting an MS message, eliminating the need for sending an MR message. Normally, the CO may reject such a mode selection, but as CPE is likely to select the mode agreed upon in the first startup sequence, the mode of operation selected should be accepted by the CO. Finally, the startup process could skip the preliminary phases altogether and jump to the channel analysis phase (see phase 608 of FIG. 6) after receiving the PRT. This can save 90% of the total startup time and is feasible since in this embodiment there is no need to undergo transceiver training phase to establish a MEDLEY set.

Many of the power spectral density requirements in the various standards are not uniform over the entire data band, leading to different PAR optimization constraints depending on the spectral masks to which each PRT must conform, which can affect the PAR optimization. The PAR optimization problem can basically be subdivided into multiple bands if the spectrum is divided into different power levels. The non-uniformity in PSD constraints can be addressed by dividing the whole band into different bands having different PSD constraints. The PAR is mitigated separately in each band. In the simplest case one should consider the PAR contribution proportional to the power in that band. In fact, if the average power in a band is significantly lower than in another band, the low power band can be ignored and PRT should be selected mainly from the highest power band. Additionally, loop length characteristics and bits per tone values can also be incorporated in considering multi-band tone selection.

Using one of the systems and methods disclosed above for reserving tones, a pool of potential tones are available for PAR reduction; be it in-medley tones, upper frequency tones, out-band reserve tones or a combination thereof. The objective for a given data signal x is to provide a compensation signal c, where the addition of c reduces the peaks of the data signal x, and where c is composed of only tones in the pool of PRT. Mathematically, it calls for the finding the optimal c for which the maximum absolute value of x+c is minimal.

A low complexity approach to constructing the compensation signal can be applied. The approach is to first construct a base compensation signal b, which can be combined with shifted and scaled versions of itself to construct the compensation signal c. The ideal base compensation signal b is a discrete time impulse. However, in order to construct such a discrete-time impulse, all tones including those not reserved for PAR mitigation would have to be used. Therefore, more realistically, a signal with a large single peak with any additional peaks being as small as possible is the most desirable.

There are several approaches to selecting this base compensation signal. One approach is to construct the frequency-domain signal $B=(x_0, x_1, x_2, \ldots x_N)$, where $x_i=1$ if i is in one of the PRT, and equal to zero otherwise. In practice due to the standards constraints on power spectral density or other factors, a value of $x_i=1$ is not always attainable. For example, upper frequency tones must be attenuated in accordance with the power spectral density requirements of the standards. In lieu of the value of 1, any positive real value could be used. The base compensation signal b can then be created by taking the IFFT of B. The resultant base compensation signal b will have a major peak at time index 0. In general, the objective is to get contributions for each tone among the PRT so they can positively contribute to a single peak at time index 0.

Figure 2A:
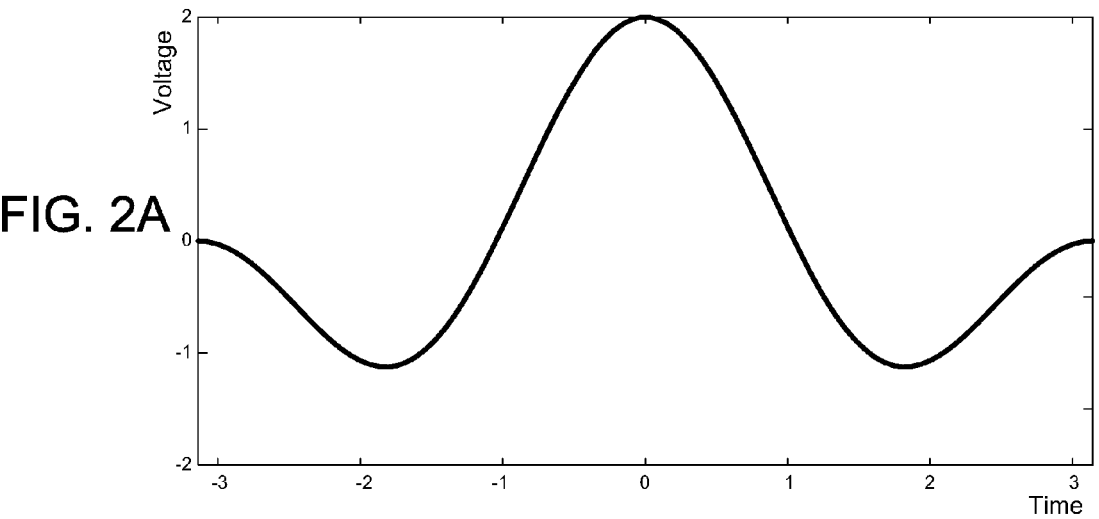
FIGS. 2A & 2B show how constructive combination of sinusoids can result in a peak.
Figure 2B:
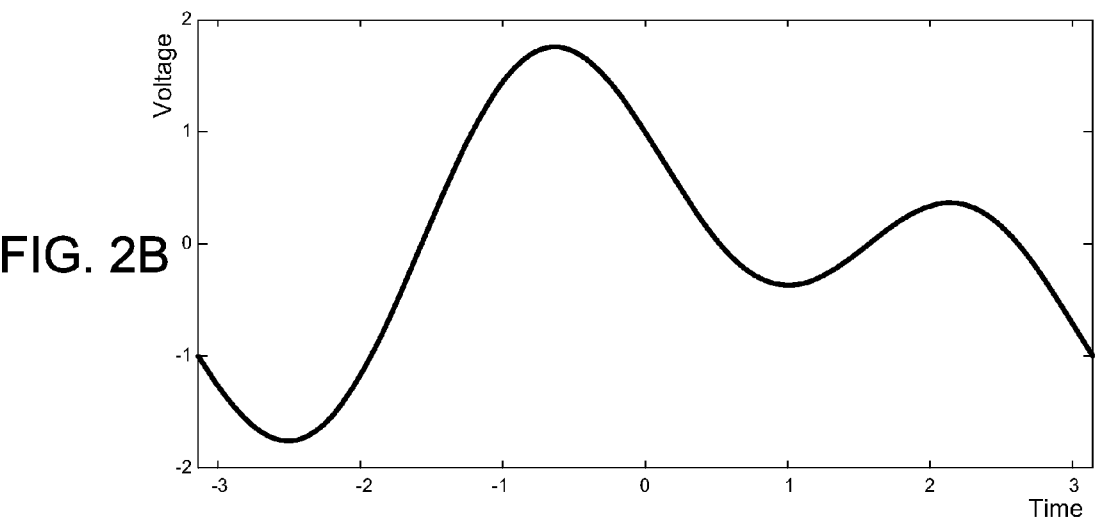
Figure 2C:
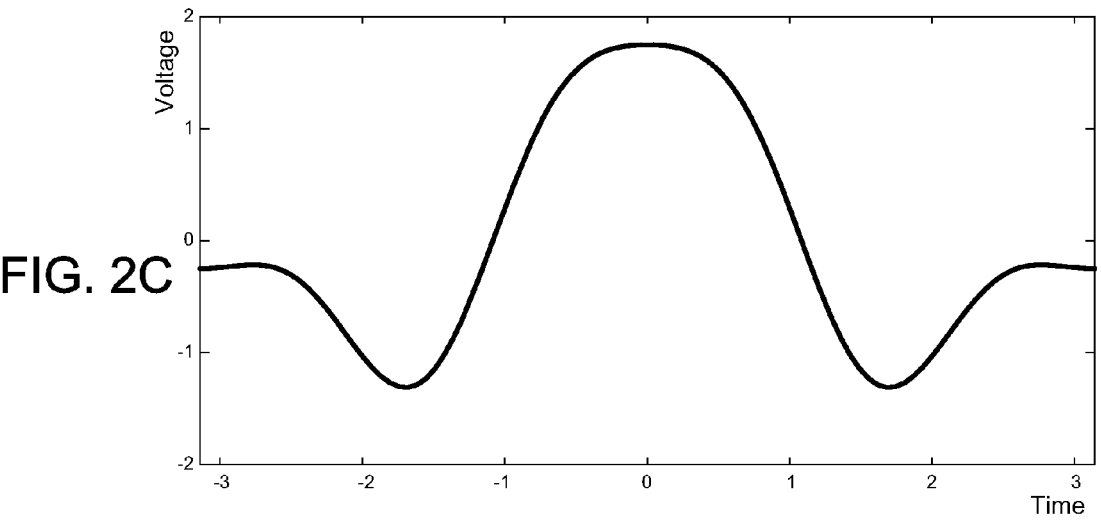
FIG. 2C shows how the addition of a sinusoid can reduce a peak.
Figure 18A:
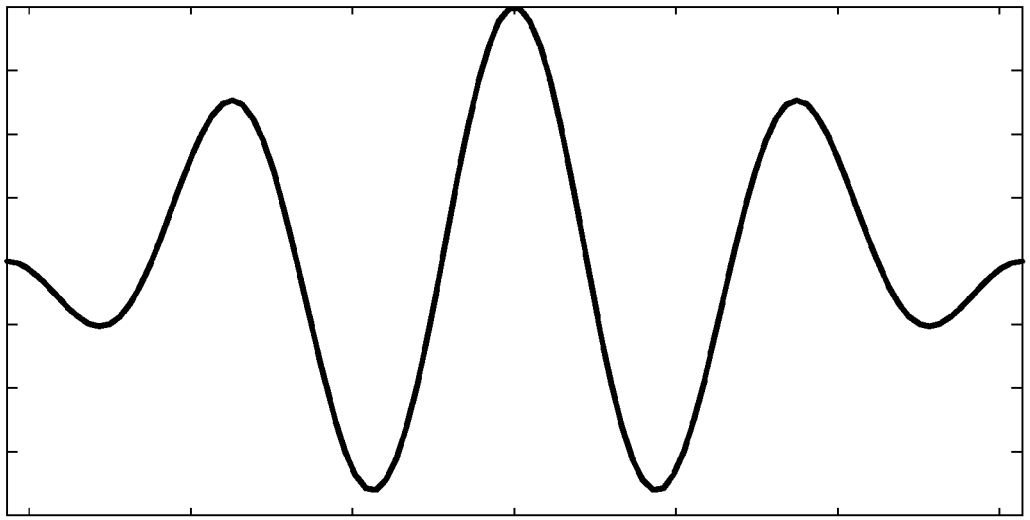
FIGS. 18A and 18B illustrate how frequencies with common factors generate secondary peaks.
Figure 18B:
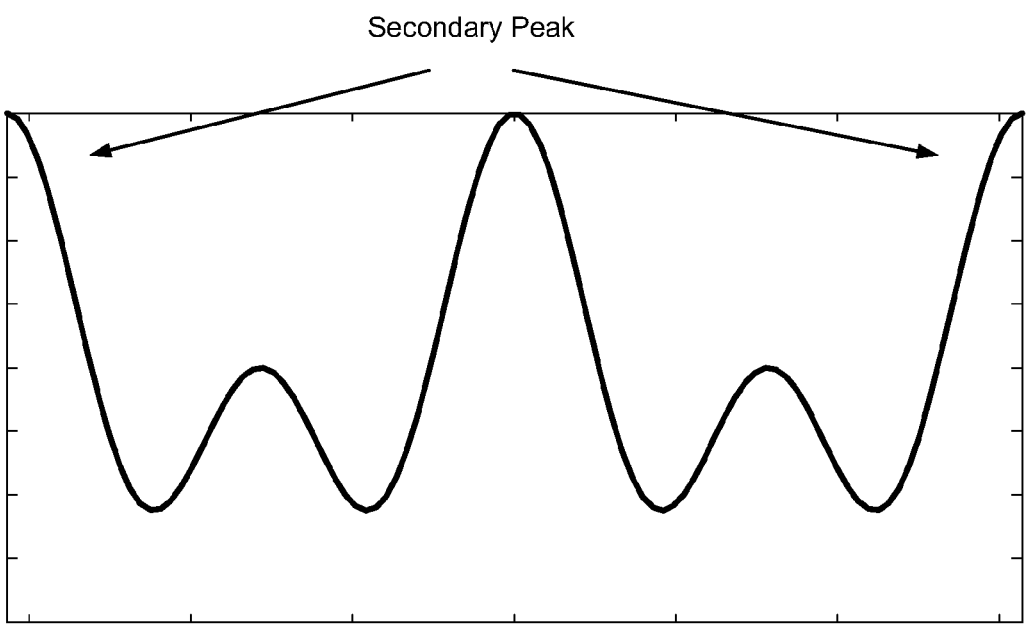

In an alternate approach, not all tones need be used. The set of PRT can be reduced to a set that is "more relatively prime." As the objective in the construction of the base compensation signal is to create a signal from the PRT with a single large peak while trying to minimize the occurrence of secondary peaks, sinusoids which share common factors could potentially be eliminated; for example, in the simple example given in FIGS. 2A & 2B. FIG. 18A shows a sinusoid with a frequency of 3 mixed with a sinusoid of frequency 4. The two sinusoids can only match precisely peak to peak once over the common period. FIG. 18B shows sinusoids with a frequency of 2 and frequency of 4. The two will match peak to peak more than once over the common period.

A simple method to create a relatively prime set is to select all the prime numbers lower than a predetermined value. This predetermined value is determined by the number of tones being considered. First, eliminate all tones that have more than one of these small prime numbers as a factor. Second, for each of the small primes, select a tone with that small prime as a factor and eliminate all other tones having the small prime as factor. If the predetermined value is sufficiently high, all remaining tones and the selected tones should be relatively prime.

FIGS. 19A-19E show a specific example of how to derive relatively prime tones. Suppose for the sake of example, the pool from which tones are drawn is between 600 and 630 inclusively. FIG. 19A begins by eliminating all numbers that have more than one distinct small prime factor. In this case 2, 3, and 5 are chosen as such primes. The eliminated tones are struck out in FIG. 19A. In accordance with the method described above the first small prime being 2, the number 614 is selected and all other tones having a factor of 2 are eliminated as shown in FIG. 19B. The next prime considered is 3, so 603 is chosen and other tones with a factor of 3 are eliminated in FIG. 19C. It should be noted that even though the prime 3 appears more than once as long as other small primes (2 or 5 in this example) do not occur, the selection is acceptable. The next prime number is 5 and tone 625 is chosen. Tone 605 having a common factor of 5 can be eliminated as shown in FIG. 19D. Inspection of the remaining tones shows the set shown in 19E share no common prime factors.

Figure 20:
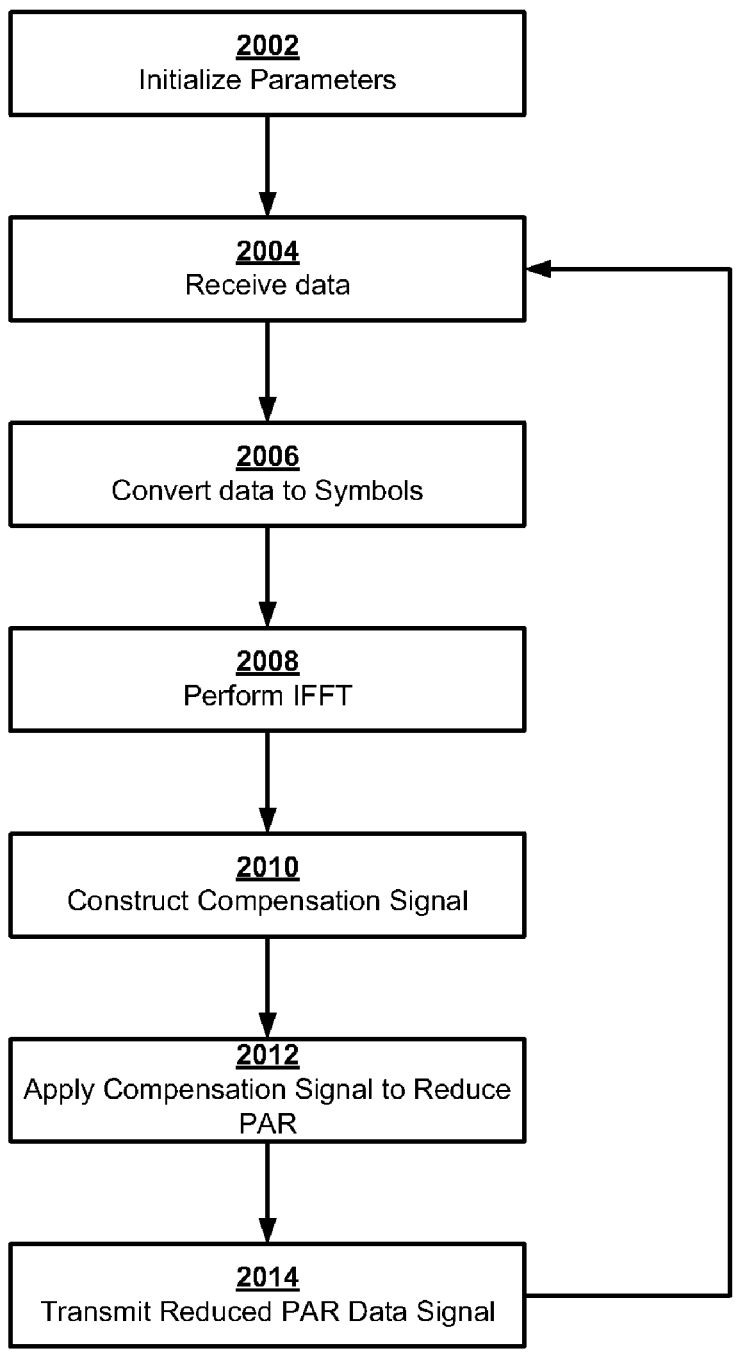
FIG. 20 illustrates the overall process of transmission of data using PAR reduction.

FIG. 20 illustrates the overall transmission process. At step 2002, initialization is performed, this can include the establishment of PRT, the various embodiments of a startup as described above, and the selection of predetermined values such as a predetermined threshold or predetermined target value. At step 2004, data for transmission is received for the current symbol period. At step 2006, the data is then mapped to a symbol based on the bits per tone available and the tones available for transmission. At step 2008 an IFFT is performed on the symbol to produce a time-domain data signal. At step 2010 a compensation signal is constructed which can be just a base compensation signal like b or a compensation signal like c. At step 2012, the compensation signal is applied to the data signal to reduce PAR. At step 2014, the data signal now with PAR reduced using the compensation signal is transmitted. The process can then start over at step 2004.

Figure 21:
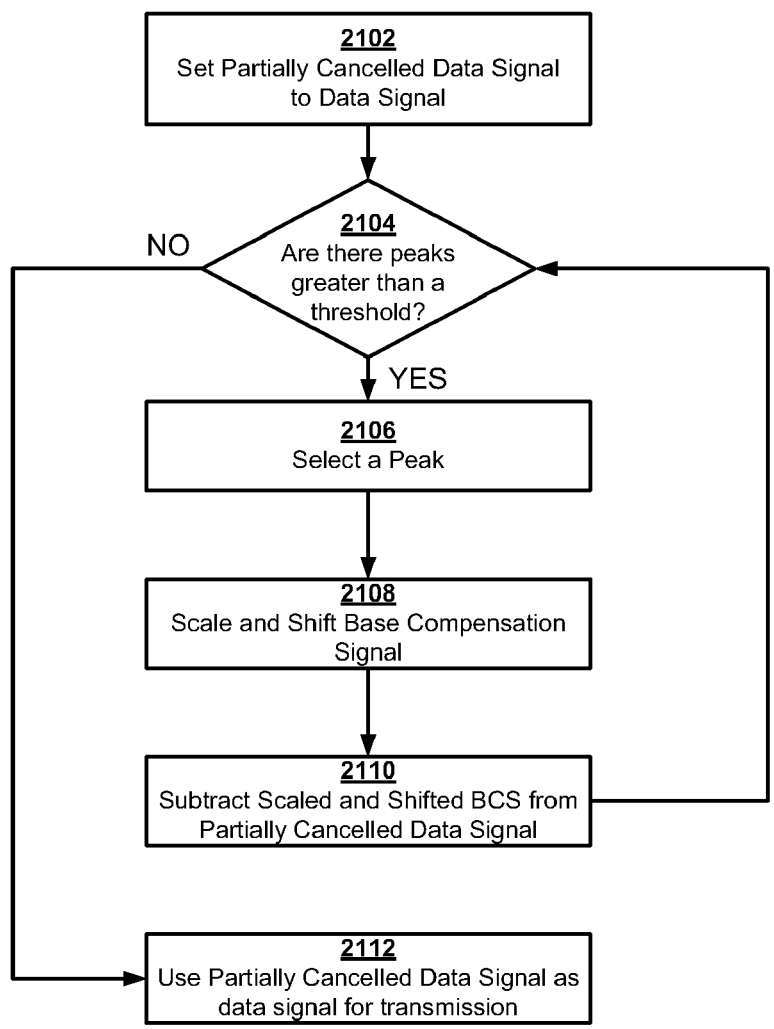
FIG. 21 illustrates an embodiment showing how a compensation signal can be applied to reduce PAR.

FIG. 21 illustrates an embodiment showing how a compensation signal can be applied to reduce PAR. In overview, the process of constructing a compensation signal first calls for the identification of all peaks in the data signal that exceeded a predetermined threshold value. As a target, the predetermined threshold is selected so that the peaks comprise no more than 2% of the total number of samples in data signal x. The process iterates through all the peaks identified and partially cancels the data signal x to a value below the predetermined threshold. In alternate embodiments, the cancellation can take the value below a predetermined target value which is below the predetermined threshold. This can possibly prevent a recurrence of this peak as the process iterates. After each iteration, the resultant partially cancelled data signal r is calculated. So after each iteration, the new r is equal to the old r with the cyclically shifted and scaled version of b subtracted from it. The process continues until either all peaks that have been identified are mitigated or a limitation on resources is reached.

Specifically, a partially cancelled data signal begins as the data signal; and as cyclically shifted and scaled base compensation signals are applied, the peaks in the partially canceled data signals are cancelled. At step 2102, the partially cancelled data signal is initialized to the data signal x. At step 2104, a decision is made to determine if there are any more peaks that need to be cancelled. If no peaks need to be cancelled the process skips the iteration and jumps to step 2114; otherwise, it proceeds to step 2106. At step 2104 additional termination conditions could be checked such as the number of iterations already encountered. At step 2106, a peak with a magnitude greater than a predetermined threshold is selected. Often the largest magnitude peak is selected. At step 2108, the base compensation signal is shifted to be centered at the peak. The base compensation signal is also scaled to cancel the peak so that the peak after cancellation is less than a predetermined target value. At step 2110, the cyclically shifted and scaled base compensation signal is subtracted from the partially cancelled data signal yielding a new partially cancelled data signal to be used in subsequent iterations. The iteration repeats by returning to step 2104. If at step 2104, it is decided that no more iterations are to be performed, at step 2112, the partially cancelled data signal is then used as the data signal; that is, it can be transmitted in step 2014 of FIG. 20.

The approach is a simple approach to implement; however, in order to cancel a peak in the partially cancelled data signal, all samples in the base compensation signal need to be scaled and subtracted. In a variation, to limit the complexity of the process, once the peaks are identified only, the samples that reside at the time indexes of those peaks are used to determine scale and shift factors. Because the number of peaks is anticipated to occupy at most 2% of the samples, the number of multiplications during each iteration can be reduced by a factor of 50.

Figure 22:
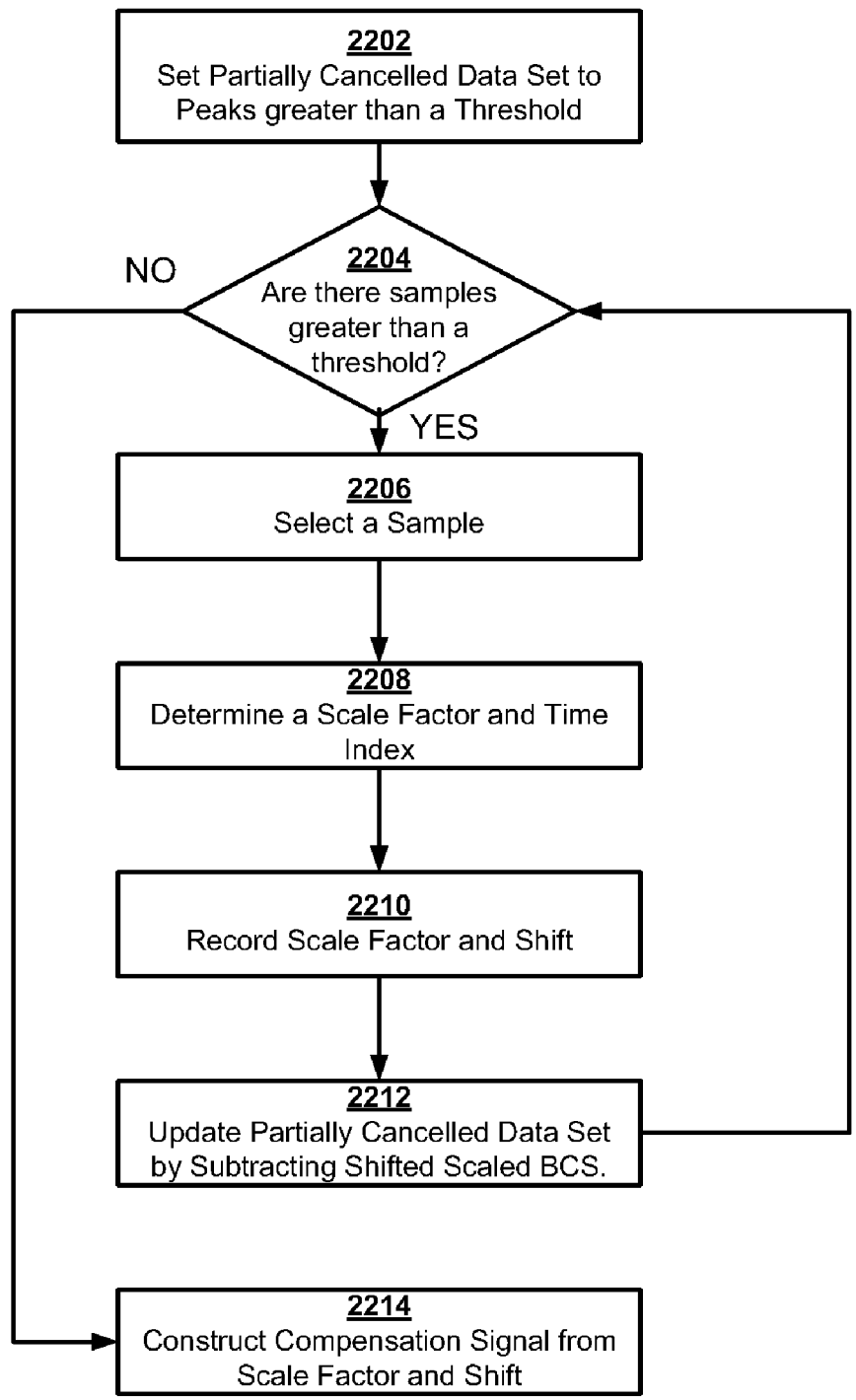
FIG. 22 illustrates another embodiment showing how a compensation signal can be used to reduce PAR.

More specifically, FIG. 22 illustrates another embodiment showing how a compensation signal can be used to reduce PAR. Rather than use a partially cancelled data signal, a subset of the samples in the partially cancelled data signal is used.

At step 2202 a partially cancelled data set is created from the set of all samples in the data signal having a magnitude greater than a predetermined threshold. At step 2204, a decision is made as to whether there are any samples remaining in the partially cancelled data set having a magnitude greater than the predetermined threshold. If not, the process performs no more iterations and skips ahead to step 2214. Otherwise the process continues to step 2206. Again, there can be additional termination conditions associated with step 2204. At step 2206, a sample in the partially cancelled data set with a magnitude greater than the predetermined threshold is selected. Often the sample with the largest magnitude is selected. At step 2208, a scale factor and time index are determined. The time index represents the amount of shift required to center the main peak of the base compensation signal to the selected sample. If the base compensation signal's main peak is centered at zero (as in the examples above), the time index is then the time index of the selected sample. The scale factor represents the factor necessary to scale the main peak of the base compensation signal to cancel the selected sample to below a predetermined target value. Mathematically, if the S is the scale factor, $M_b$ is the value of the base compensation signal main peak, Tt is the target value, and s is the value of the sample then $S \geq (s-Tt)/M_b$. The pair values of scale factor and time index are recorded at step 2210 so that they can be used to construct a time based compensation signal. At step 2212, the samples in the partially cancelled data set are updated by subtracting scaled samples in a cyclically shifted base compensation signal (shifted by the time index determined in step 2208) corresponding to the time indexes of the samples in the partially cancelled data set. In this manner only those samples in the cyclically shifted base compensation signal corresponding to partially cancelled data set samples need to be scaled, thus requiring far fewer multiplications. The iteration then repeats by returning to step 2204. At step 2214, a compensation signal is constructed by summing over all pair values of scale factor and time index of the cyclically shifted and scaled base compensations signals.

Though the above method reduces complexity, each iteration requires numerous multiplications. The multiplications can be eliminated using a scaled version of b, b' that could be scaled initially before the process iterates. Like the method described above, only the time indexes of those peaks that exceed a predetermined threshold are considered. However, at each iteration a peak is selected to be mitigated, b' is cyclically shifted and that shifted version of b' subtracted (or added depending on sign) from samples in the partially cancelled data set. In this way to calculate the time based compensation signal, only the number of times b' is subtracted (or added) from the data signal at each time index need be tracked. This further reduces the complexity by eliminating the need to scale b during each iteration. The prescaled base compensation signal b' can be derived by scaling b by a predetermined value. A value equal to the maximum absolute value of b has been found to be effective.

Figure 23:
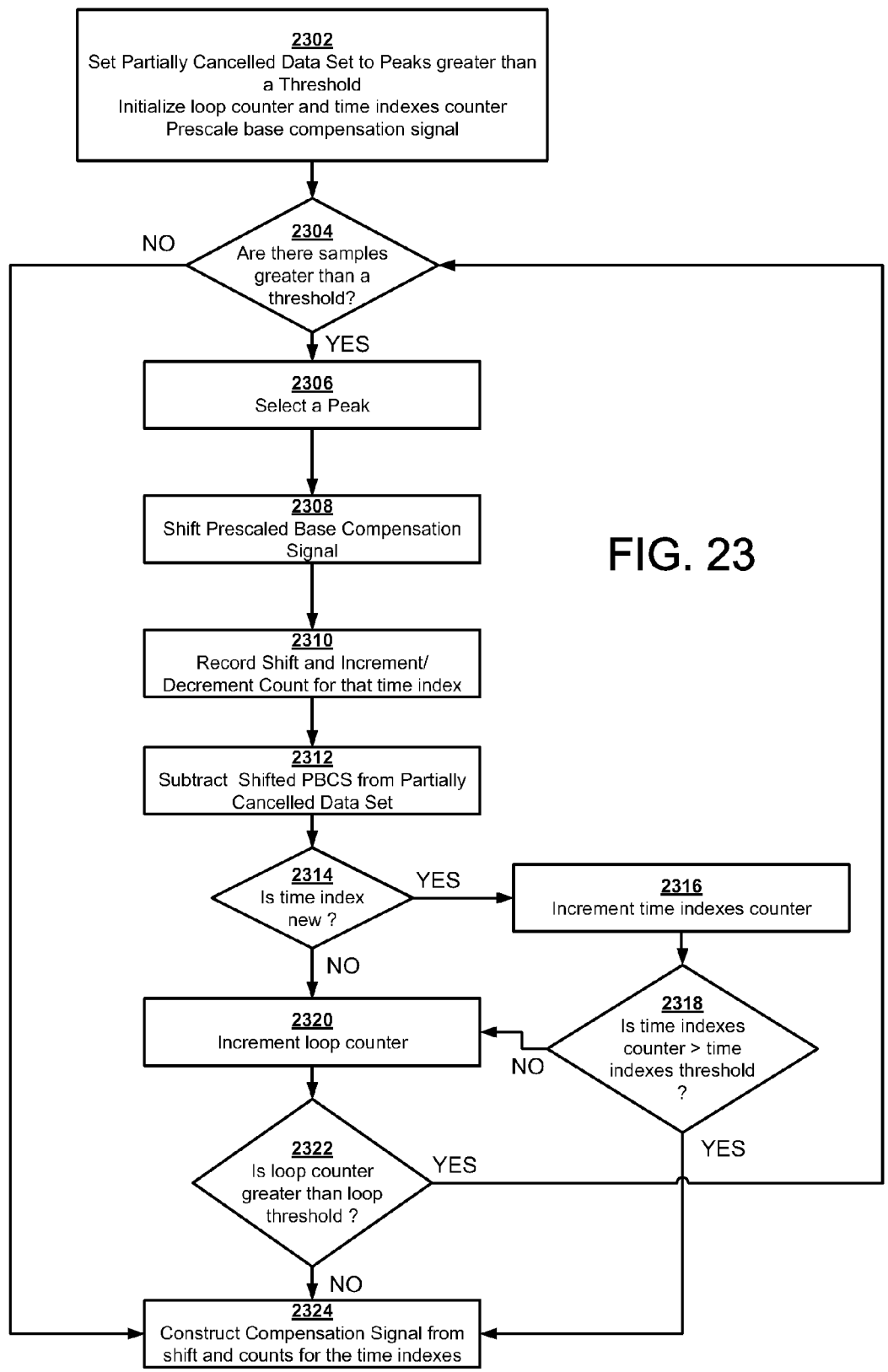
FIG. 23 illustrates yet another embodiment showing how a compensation signal can be used to reduce PAR.

More specifically, FIG. 23 illustrates yet another embodiment showing how a compensation signal can be used to reduce PAR. At initialization step 2302, as in step 2202, a partially cancelled data set is constructed from samples in the data signal greater in magnitude than a predetermined threshold. At step 2304, a decision is made as to whether there are any samples in the partially cancelled data set greater in magnitude than the predetermined threshold. If not, the process skips to step 2324; otherwise, it proceeds to step 2306 where a sample with a magnitude greater than the predetermined threshold is selected. Often, the sample with the largest magnitude is selected. At step 2308, a time index is determined which shifts the prescaled base compensation signal so that its main peak is centered at the selected sample. At step 2310 the time index is recorded and a count associated with that sample (or equivalently that time index) is incremented or decremented. It is incremented if the sample is positive and decremented if the sample is negative. At step 2312, the samples in the partially cancelled data set are updated by subtracting (or adding if the selected sample is negative) samples in a cyclically prescaled shifted base compensation signal (shifted by the time index determined in step 2310) corresponding to the time indexes of the samples in the partially cancelled data set. In this manner no multiplications are required. To further limit the number of iterations performed, a counter keeps track of the number of unique time indexes considered and the number of times the iteration is encountered. To this end, at step 2314, a decision is made as to whether the time index of the sample has been encountered before. If the time index has not been encountered before, at step 2316, a time indexes counter is incremented and at step 2318 a determination is made as to whether the time indexes counter exceeds a time indexes threshold; if so, then the process skips to step 2324. If at step 2314, the time index is determined to have been encountered before, then the process proceeds to step 2320. If the time indexes counter is determined not to have exceeded the time indexes limit at step 2318, the process also proceeds to step 2320. At step 2320, a loop or iteration counter is incremented. At step 2322, if this counter exceeds a loop threshold, the process skips to step 2324; otherwise, the iteration repeats at step 2304. At step 2214, a compensation signal is constructed by contributing (based on each time index encountered) a version of the prescaled cyclically shifted base compensation signal (shifted by the time index as determined in step 2208) where the cyclically shifted prescaled base compensation signal is also scaled by the value in the count associated with that time index. Basically, the count associated with the time index indicating the number of copies of the cyclically shifted prescaled base compensation signal needs to be included in the compensation signal.

In any of the preceding embodiments, the maximum power of the PRT must also be monitored in this process so that it does not violate the PSD specified the standard.

Figure 24:
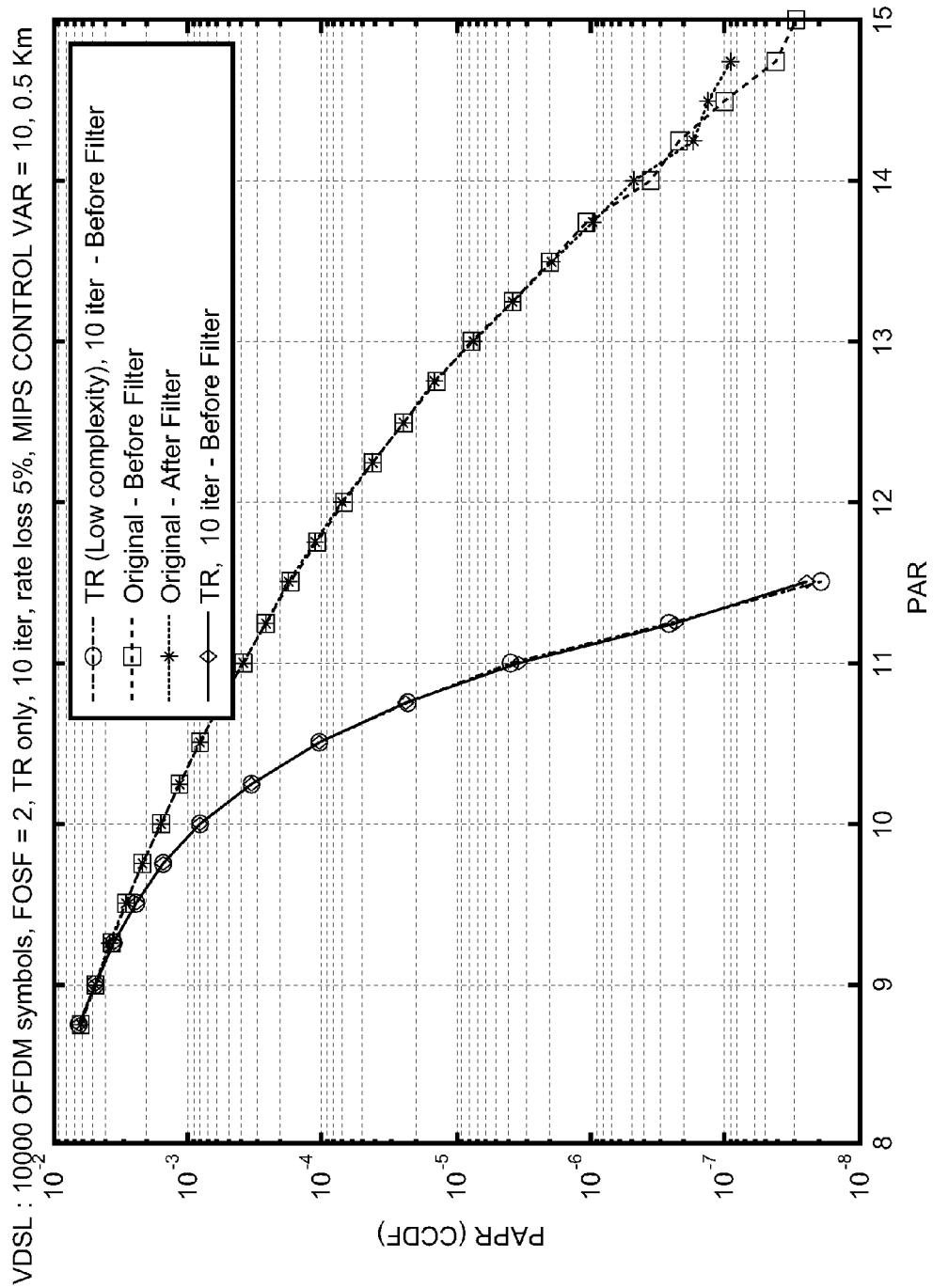
FIG. 24 depicts the results by simulation of this low-complexity algorithm for PAR reduction.

FIG. 24 depicts the results by simulation of this low-complexity algorithm for PAR reduction. The following example is a VDSL system which occupies tones between 32 to 869 and 1206 to 1971. The loop length is simulated at 500 meters. The predetermined maximum locations and predetermined maximum iterations are both set to 10. The rate loss is 5%. The plot shows the probability of a clip per time-domain sample as a function of the PAR in dB (i.e., the probability that the absolute value of a time-domain sample exceeds the threshold specified in terms of a factor of the average power). As can be seen from the graph, the low complexity method depicted in FIG. 23 compares favorably to the normal PAR reduction techniques.

Eighty in-band tones are used and are given by the set [33 38 73 87 103 173 189 190 193 210 211 223 239 276 277 290 296 300 310 352 380 387 397 495 512 537 556 588 611 615 625 629 635 656 701 763 766 771 790 827 1214 1227 1240 1273 1293 1319 1355 1388 1399 1401 1416 1429 1436 1443 1445 1461 1534 1587 1626 1642 1660 1675 1686 1689 1695 1728 1777 1780 1785 1788 1789 1811 1820 1865 1868 1871 1876 1924 1934 1965].

The methods and systems above deal with a fixed PAR reduction process where the PRT are selected ahead of time and transmitted through a handshake at startup time. From the selected PRT a peak mitigation process such as the low complexity approach can be applied. However, because different data symbols received at the IFFT will have different PARs, the number of tones required for peak mitigation can vary. If not all tones are needed, many can be used to transmit data and reduce the rate loss.

An adaptive system can be used to further improve the PAR reduction performance while also improving the overall data rate. In overview, both the transmitter and receiver are configured with a preset collection of PRT sets. The sets typically vary depending on the percentage of tones used. In the particular embodiment where the PRT sets differ by the percentage of tones used, a particular PRT set can be identified by this percentage; e.g., one PRT set might be identified as the 5% set while another as the 7.5% set, etc. The preset collections can be preconfigured into both the transmitter and receiver or transferred from the transmitter to the receiver using a vendor specific message during a startup sequence.

In addition a sufficient number of tones are now reserved for conveying an identification of each of the PRT sets. For example, if six bits are required, three tones with the ability to carry two bits per tone can be allocated as the PRT signaling tones. Based on PAR statistics, the particular PRT set can be selected and sent to the receiver using the PRT signaling tones. When the PRT signaling tones are decoded at the receiver, the tones used for PAR and for data transmission can be determined. For example, if the PAR statistics dictate that a 5% set needs to be used for PAR reduction, the PRT set associated with 5% is communicated with an identifier to the receiver using the PRT signaling tones. The receiver recognizes the identifier and recognizes the 5% PRT set as those tones reserved for PAR reduction.

The statistics that can be used to determine the number of tones needed for PAR reduction can be based on the maximum PAR for a given signal or the number/percentage of samples that exceed a predetermined PAR threshold. A lookup table can be used to determine how many PRTs are generally required for a certain degree of PAR reduction. This lookup table can be derived experimentally by simulating or measuring the PAR reduction for each percentage of PRT.

Figure 25:
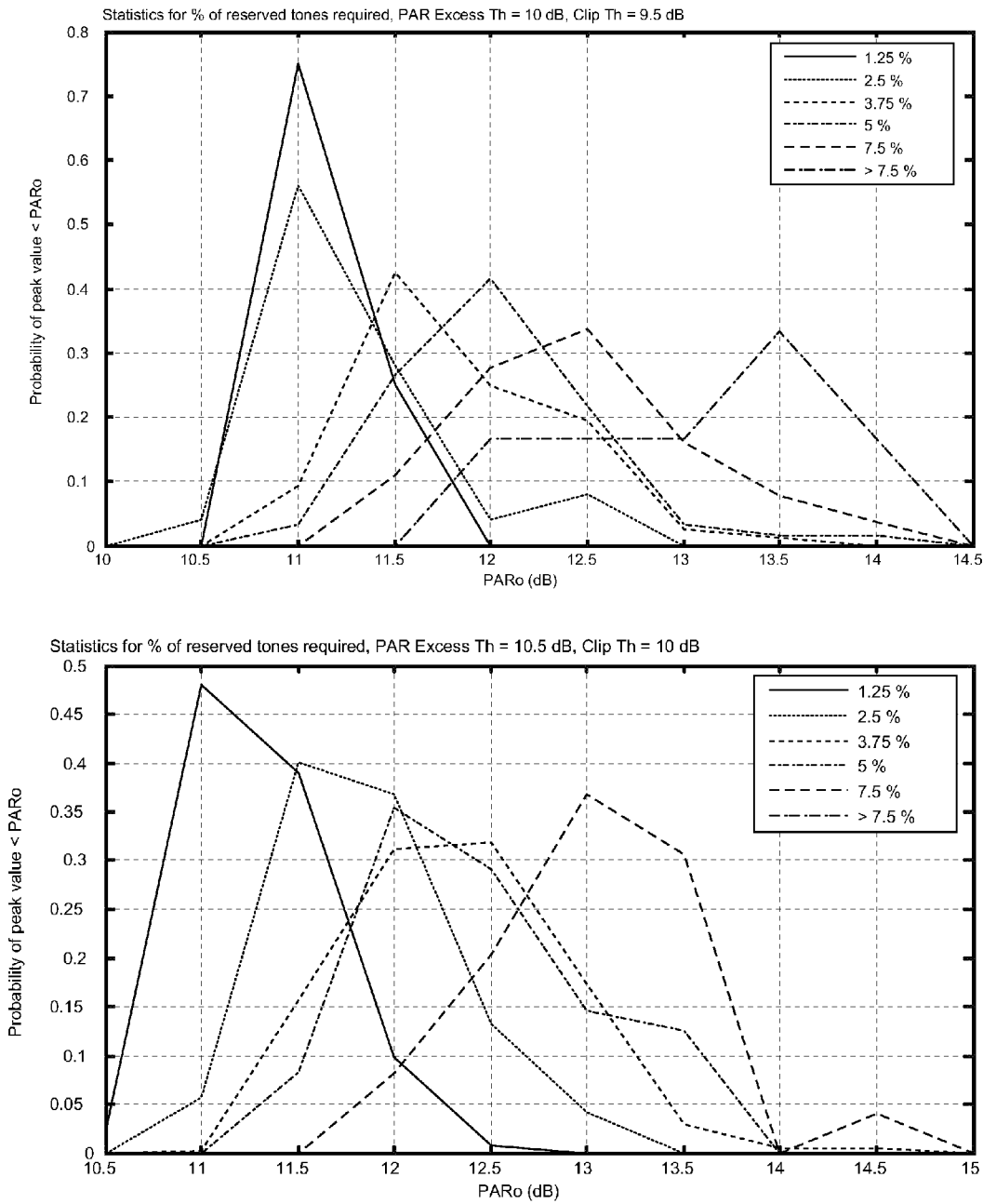
FIG. 25 shows graphs which illustrate statistics using the maximum peak magnitude that can be used to determine the percentage of PRT required.

FIG. 25 shows graphs which illustrate statistics using the maximum peak magnitude that can be used to determine the percentage of PRT required. The graphs represent histograms of probability. The x-axis are individual PAR values in 0.5 db increments. The values on the y-axis represent for each x value the probability that the sample falls ±0.25 dB of the x value. For example, for the point for 11 dB, the y value represents the probability that the PAR is between 10.75 dB and 11.25 db. The top graph uses an excess PAR threshold of 10 dB and the bottom graph uses an excess PAR threshold of 10.5 dB. Graphs for PRT percentages of 1.25%, 2.5%, 3.75%, 5%, 7.5% and >7.5% are shown. These statistics could be adopted if the approach of using the maximum signal PAR was used to derive a lookup table.

Figure 26:
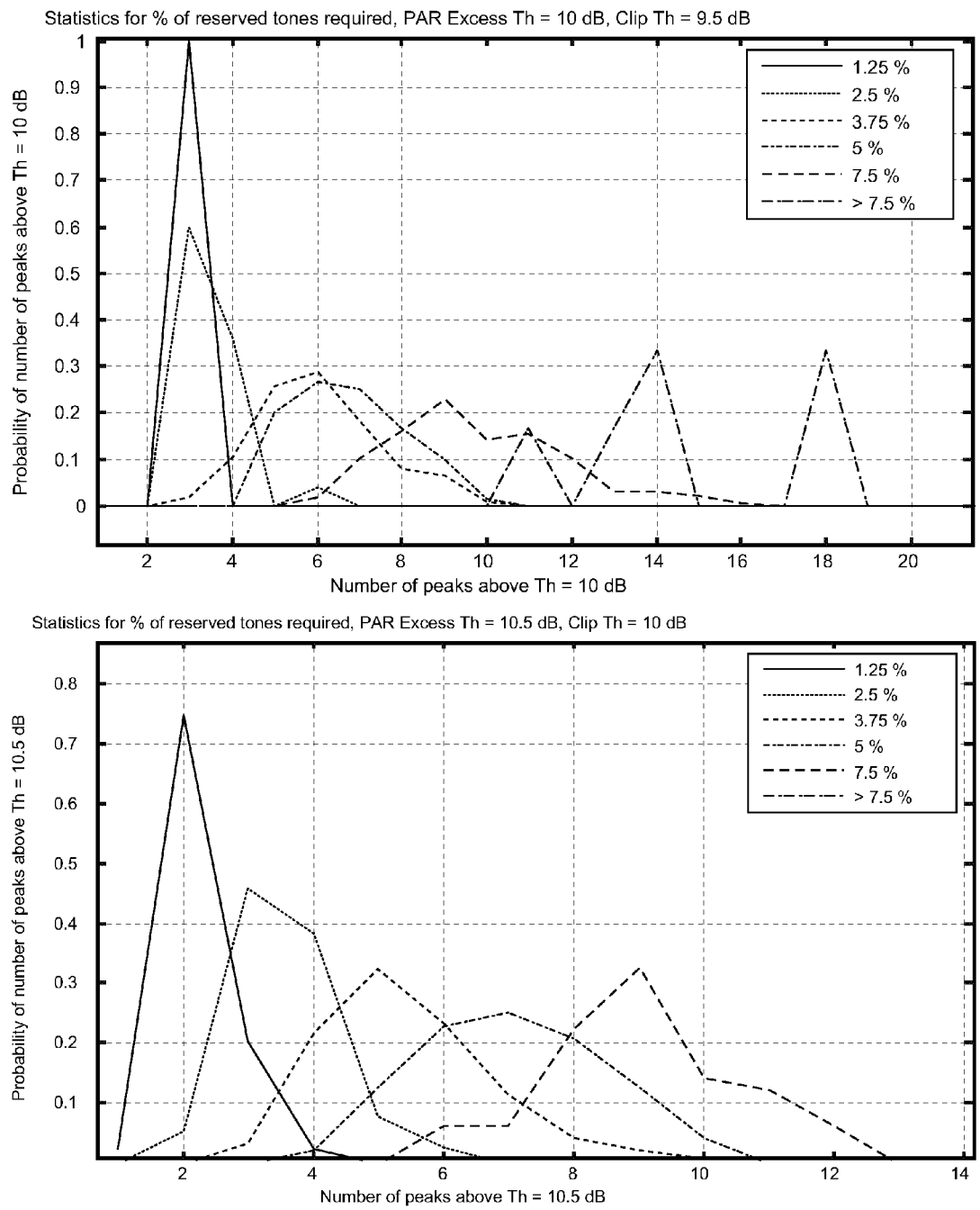
FIG. 26 shows graphs which illustrate that statistics using the probability of peaks exceeding a threshold that can be used to determine the percentage of PRT required.

FIG. 26 shows graphs which illustrate statistics using the probability of peaks exceeding a threshold that can be used to determine the percentage of PRT required. Again, the graphs represent histograms of probability. Here the x-axis represents the number of peaks greater than the excess PAR threshold. The values on the y-axis represent for each x value the probability that the DMT symbol has x number of peaks greater than the excess PAR threshold. Again, the top graph uses an excess PAR threshold of 10 db, and the bottom graph uses an excess PAR threshold of 10.5 dB, and graphs for PRT percentages of 1.25%, 2.5%, 3.75%, 5%, 7.5% and >7.5% are shown.

During each symbol period, data is transmitted along with an identifier which identifies the PRT set being used along with a compensation signal comprising tones in the PRT sets. Depending on the data transmitted, the PRT set can change based on the number of tones required to achieve the target PAR reduction. With the selected PRT set, a reserved tone PAR reduction technique such as the low complexity technique described above can be applied.

Figure 27:
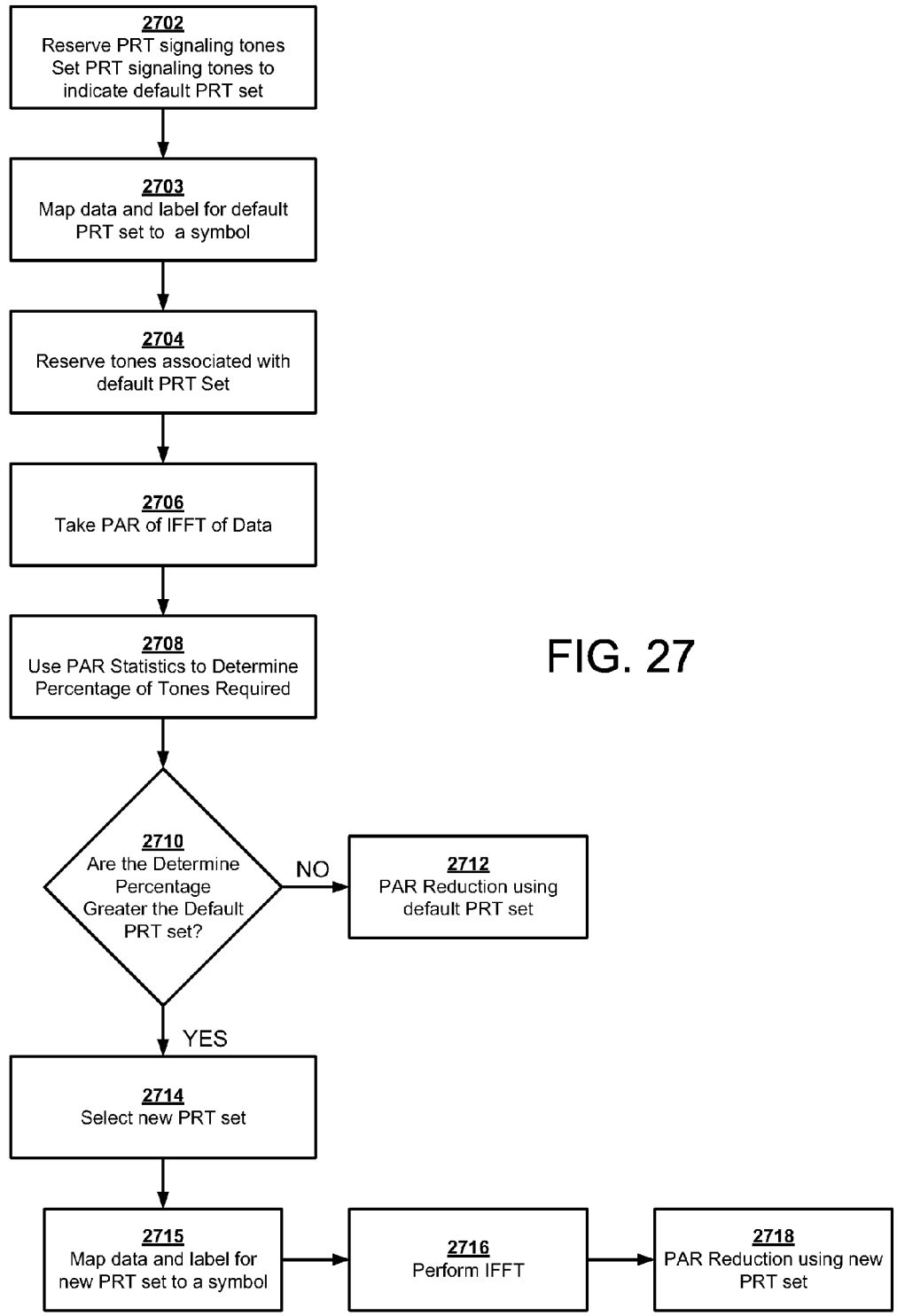
FIG. 27 shows a flow chart illustrating the adaptive PAR reduction technique in detail.

FIG. 27 shows a flow chart illustrating the adaptive PAR reduction technique in detail. At step 2702, reserve a predetermined number of tones (the PRT signaling tones) to indicate that the default PRT set is being used. Typically, the default PRT set is the PRT set associated with the lowest percentage of tones used. At step 2703, a label representing the default PRT set and the data are mapped into a symbol. At step 2704, the PRT are reserved. At step 2706, using the defaults given in steps 2702 and 2704 and the data to be transmitted, take the PAR of the IFFT of the symbol. At step 2708, use the PAR statistics to determine the percentage of tones required for the target PAR reduction. This can be done using lookup tables as described above. At step 2710, if the percentage of tones required is equal to the default PRT set, then at step 2712, the data signal can be processed using the default PRT set to perform PAR reduction. Otherwise, the percentage of tones required for target PAR reduction is larger than the default PRT set at step 2702. At step 2714, a PRT set having at least the required percentage of tones is selected. At step 2715, the PRT signaling tones are set to indicate the new PRT set, and the label representing the new set along with a subset of the original data are mapped into a new symbol. In this embodiment, the new PRT set will reserve more tones than the default set, leaving fewer tones available for mapping data; hence, a subset of the original data is mapped at this step. In general, if the new PRT set reserves fewer tones than the default set, additional data could be mapped using the tones no longer reserved. The new symbol is converted into a revised time-domain data signal with an IFFT at step 2716. At step 2718, this revised time-domain data can be processed using the new PRT set to perform PAR reduction. It should be noted that when using a technique such as the low complexity PAR reduction described above in combination with the described adaptive PAR reduction, the maximum number of iterations can vary depending on the PRT set being used. Typically, larger PRT sets would require more iterations to produce adequate PAR reduction.

Figure 28:
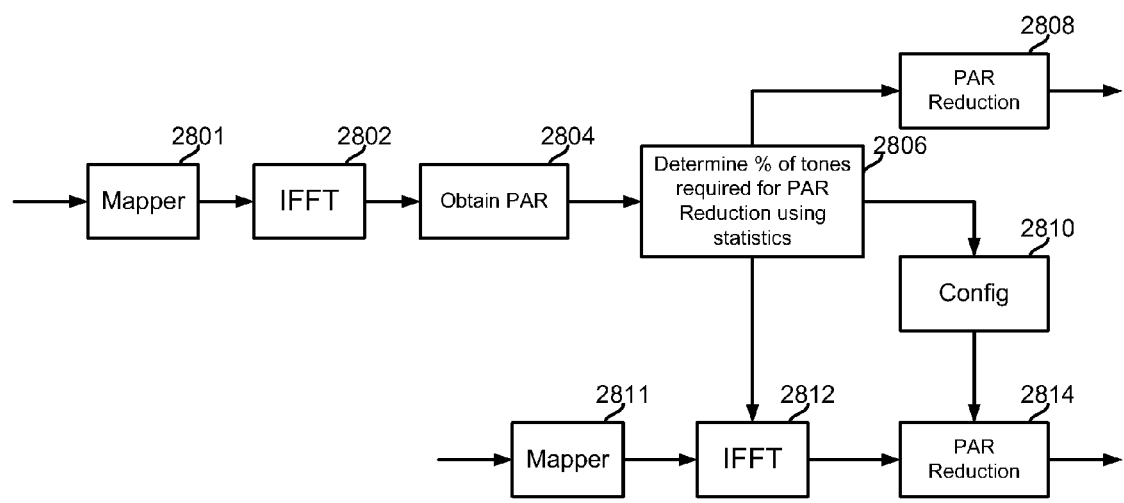
FIG. 28 is a system employing the adaptive PAR reduction technique embodied in FIG. 27.

FIG. 28 is a system employing the adaptive PAR reduction technique embodied in FIG. 27. A data signal is received by mapper 2801, which maps data along with the label associated with a default set of PRT using PRT signaling tones into a symbol. The symbol is converted into a time-domain signal by IFFT 2802 based on the default values as given in steps 2702 and 2704. The PAR is determined by module 2804. Module 2806 determines the percentage of tones required for the target PAR reduction. For some embodiments, module 2806 selects a selected set of PRT from a predetermined plurality of sets of PRT based on the PAR, said selected set having a label. In accordance with such embodiments, module 2806 further compares the label of the selected set to the default label. If the default PRT set contains an adequate percentage of tones required, PAR reduction module 2808 performs PAR mitigation. If the default PRT set is insufficient, module 2806 selects the alternate path where a new PRT set is selected by configuration module 2810 which provides updated time-domain samples using the new PRT set. Mapper 2811 now maps the label associated with the new PRT set along with a subset of the original data into a new symbol without using the tones reserved in the new PRT set. The IFFT 2812 converts the new symbol into a time-domain signal. PAR reduction module 2814 performs PAR mitigation. Though depicted as separate modules, IFFT 2802 and IFFT 2812 could be the same module. Likewise, PAR reduction modules 2808 and 2814 can also be the same module.

Since whenever a larger number of tones are used, fewer bits can be transmitted, any data that could not be transmitted in a given symbol period will be stored to be transmitted in the subsequent symbol period. To incorporate the adaptive PAR mitigation system, a message is partitioned by a functional block into symbols, and another functional block maps the symbols prior to being sent to the adaptive PAR mitigation system. Therefore, the adaptive PAR mitigation system should communicate the number of data bits actually transmitted back to the partitioning functional block so that the data can be re-encoded and retransmitted upon the next symbol period.

The effectiveness of the adaptive PAR reduction technique has been shown through simulation. A VDSL system is simulated using the 5 PRT sets shown in FIG. 29, representing the tone percentages of 1.25% (default), 2.5%, 3.75%, 5% and 7.5%. Additionally, the maximum number of iterations allowed in PAR reduction is 6, 10, 16, 20 and 30, respectively.

Figure 30:
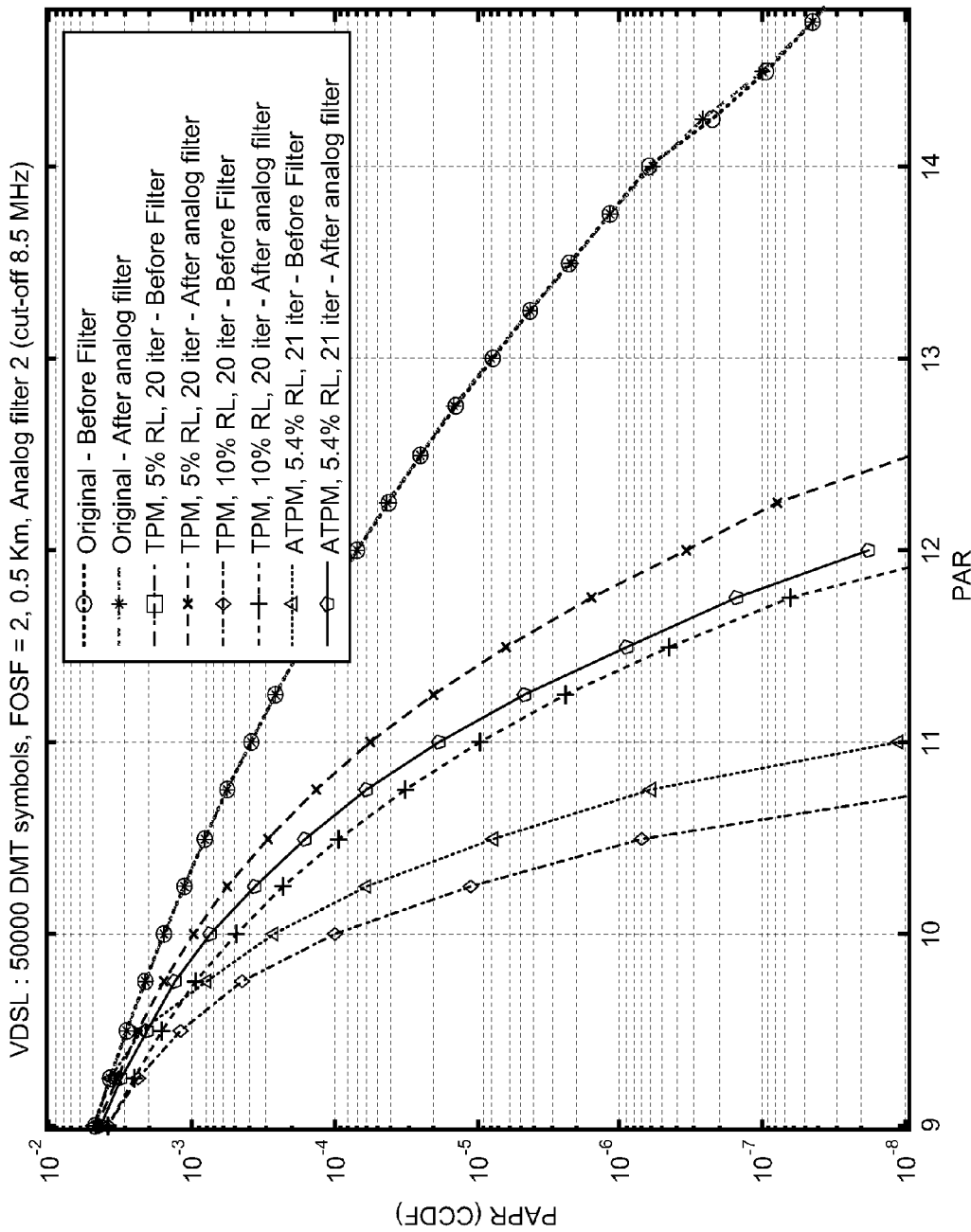
FIG. 30 illustrates the simulated results using the adaptive PAR reduction technique with an average rate loss of 5.4%.

In the first simulation, the target PAR is 9.5 dB with an excess PAR threshold of 10 dB. The target PAR is the level where the probability of clipping by the components is below a predetermined probability. The excess PAR threshold is the parameter used in the algorithm to determine which peaks in the time-domain samples need to be cancelled. These targets yield an average rate loss of 5.4% for this adaptive PAR reduction technique. By comparison, fixed PAR reduction with rate loss of 5% and 10% is shown in FIG. 30. Additionally, the results are shown before and after an analog filter is applied with a cut-off frequency of 8.5 MHz. As indicated previously, insertion of filters in the time-domain path after the compensation signal has been applied can lead to an increase in PAR due to the peak-regrowth effect (filtering drives the distribution of the time-domain signal towards being Gaussian). Since the PAR can increase due to analog filter, it is important to evaluate the effectiveness of the PAR reduction technique not only at the output of the digital process, but also at the output of the analog filter to confirm that the peak-regrowth induced by these analog filters does not vitiate the PAR reduction achieved after applying the compensation signal.

Figure 31:
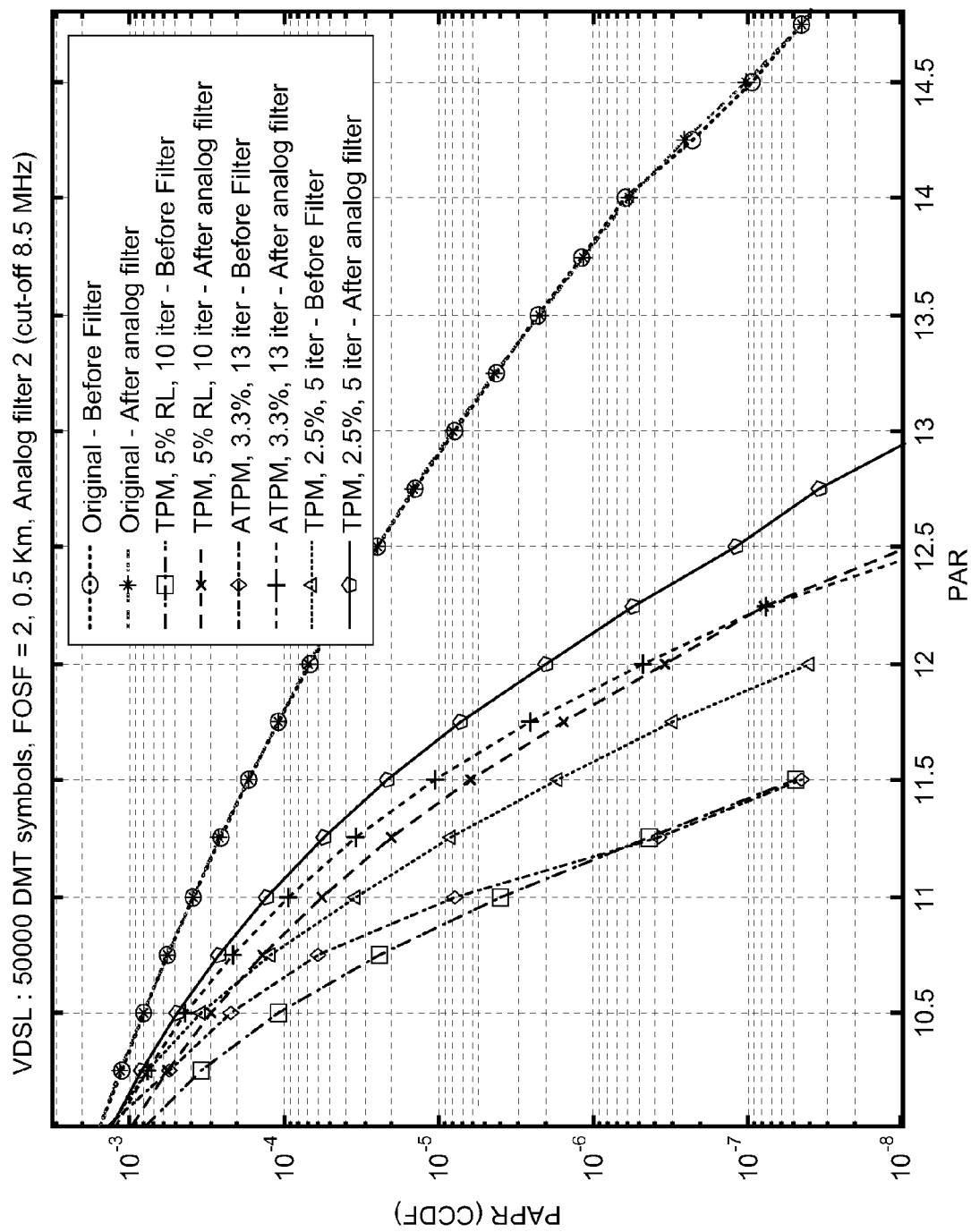
FIG. 31 illustrates the simulated results using the adaptive PAR reduction technique with an average rate loss of 3.3%.

In the second simulation, the target PAR is higher at 10 db with an excess PAR threshold of 10.5 dB. These targets yield an average rate loss of 3.3% for this adaptive PAR reduction technique. By comparison, fix PAR reduction with rate loss of 2.5% and 5% are shown in FIG. 31.

In both circumstances, the data rate loss number is significantly smaller with the adaptive PAR reduction than with a fixed PAR reduction technique, while maintaining comparable PAR reduction.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed:

1. A method for adaptively reducing peak-to-average power ratio (PAR) in transmitting data comprising:
    mapping a portion of the data and a default label indicative of a default set of PAR reduction tones (PRT) tones into a symbol, wherein the default label is mapped using PRT signaling tones;
    generating a time-domain signal with an inverse fast Fourier transform (IFFT), said time-domain signal having a PAR;
    calculating the PAR of said time-domain signal;
    selecting a selected set of PRT from a predetermined plurality of sets of PRT based on the PAR, said selected set of PRT having a label;
    comparing the label of the selected set to the default label;
    if the label of the selected set and the default label differ, mapping a subset of the portion of the data and the label of the selected set into a revised symbol, generating a revised time-domain signal with an IFFT and processing the revised time-domain signal using the selected set of PRT to reduce PAR; and
    if the label of the selected set and the default label are identical, processing the time-domain signal using the default set of PRT to reduce PAR.

2. The method of claim 1, wherein the each of the predetermined plurality of sets of PRT represents a percentage of total tones.

3. The method of claim 1, wherein each set of the predetermined plurality of sets of PRT has a number of PRT and the selecting comprises
    determining a number of PRT required using PAR statistics;
    comparing the number of PRT required with the number of PRT in each set in the predetermined plurality of sets of PRT and
    selecting a set of PRT having a number essentially matching the number of PRT required.

4. The method of claim 3, wherein the statistics comprises a maximum PAR.

5. The method of claim 3, wherein the statistics comprises a percentage of time-domain samples exceeding a predetermined threshold.

6. The method of claim 1, wherein the processing the revised time-domain signal and the processing the time-domain signal each comprise:
    constructing a base time-domain compensation signal from set of PAR reduction tones;
    selecting a peak in the data signal greater than a predetermined threshold;
    cyclically shifting the base time-domain compensation signal to align the base time-domain compensation signal to the peak;
    scaling the base time-domain compensation signal by a scale factor; and
    subtracting the base time-domain compensation signal scaled by the scale factor from the data signal;

wherein the scale factor is chosen to reduce the peak in magnitude.

7. The method of claim 1, wherein the processing the revised time-domain signal and the processing the time-domain signal each comprise:
constructing a time-domain compensation signal from PRT; and
using the compensation signal to reduce PAR.

8. A digital subscriber line (xDSL) system comprising:
a first mapper configured to map data and a default label indicative of a default set of peak-to-average power ratio (PAR) reduction tones (PRT) tones into to a first symbol;
a first IFFT configured to convert the first symbol to a first time-domain signal;
a PAR determination module coupled to the output of the IFFT;
a PRT determination module coupled to the PAR determination module and configured to select a set of PRT from a predetermined plurality of sets of PRT based on the output of the PAR determination module;
a first PAR reduction module coupled to the PRT determination module configured to reduce PAR based on the default set of PRT;
a second mapper coupled to the PRT determination module and configured to map a subset of the data and a label corresponding to a set of PRT selected by the PRT determination module into a second symbol;
a second IFFT configured to convert the second symbol to a second time-domain signal; and
a second PAR reduction module coupled to the second IFFT configured to reduce PAR based on the set of PRT, wherein one or more of the first mapper, first IFFT, PAR determination module, PRT determination module, first PAR reduction module, second mapper, second IFFT and second PAR reduction module are implemented by software executing on a processor.

9. The xDSL system of claim 8, wherein the each of the predetermined plurality of sets of PRT represents a percentage of total tones.

10. The xDSL system of claim 8, wherein the PRT determination module selects the set of PRT from a predetermined plurality of sets of PRT by using PAR statistics.

11. The xDSL system of claim 10, wherein the PAR statistics comprises a maximum PAR.

12. The xDSL system of claim 10, wherein the PAR statistics comprises a percentage of time-domain samples exceeding a predetermined threshold.

13. The xDSL system of claim 8, wherein the first mapper and the second mapper are the same.

14. The xDSL system of claim 8, wherein the first IFFT and the second IFFT are the same.

15. The xDSL system of claim 8, wherein the first PAR reduction module and the second PAR reduction module are the same.

16. An xDSL system for transmitting digital data comprising:
first means for mapping a portion of the data and a default label indicative of a default set of peak-to-average power ratio (PAR) reduction tones (PRT) tones into a symbol, wherein the default label is mapped using PRT signaling tones;
first IFFT means for generating a time-domain signal from the symbol said time-domain signal having a PAR;
means for calculating the PAR of said time-domain signal;
means for selecting a selected set of PRT from a predetermined plurality of sets of PRT based on the PAR, said selected set having a label;
means for comparing the label of the selected set to the default label;
first means for processing the time-domain signal using the default set of PRT to reduce PAR, if the label and the default label are identical;
second means for mapping a subset of the portion of the data and the label of the selected set into a revised symbol, if the label and the default label differ;
second IFFT means for generating a revised time-domain signal from the revised symbol, if the label of the selected set and the default label differ; and
second means for processing the revised time-domain signal using the selected set of PRT to reduce PAR, if the label of the selected set and the default label differ.

17. The xDSL system of claim 16, wherein the each of the predetermined plurality of sets of PRT represents a percentage of total tones.

18. The xDSL system of claim 16, wherein the means for selecting is further configured to select a selected set of PRT from a predetermined plurality of sets of PRT using PAR statistics based on at least one of a maximum PAR and a percentage of time-domain samples exceeding a predetermined threshold.

19. The xDSL system of claim 16, wherein the first means for processing and the second means for processing each comprises:
means for constructing a time-domain compensation signal from PRT;
means for applying the compensation signal to reduce PAR.

20. The xDSL system of claim 19, wherein the time-domain compensation signal is a base time-domain compensation signal and means for applying comprises:
means for selecting a peak in the data signal greater than a predetermined threshold;
means for shifting the base time-domain compensation signal to align the base time-domain compensation signal to the peak to generate a shifted base time-domain compensation signal;
means for scaling the shifted base time-domain compensation signal by a scale factor to generate a scaled and shifted base time-domain compensation signal; and
means for subtracting the scaled and shifted base time-domain compensation signal from the data signal;
wherein the scale factor is chosen to reduce the peak in magnitude.

* * * * *

UNITED STATES PATENT AND TRADEMARK OFFICE
CERTIFICATE OF CORRECTION

PATENT NO. : 8,275,067 B2  Page 1 of 1
APPLICATION NO. : 12/139146
DATED : September 25, 2012
INVENTOR(S) : Garg et al.

It is certified that error appears in the above-identified patent and that said Letters Patent is hereby corrected as shown below:

In Fig. 27, Sheet 23 of 27, in Box "2710", Line 3, delete "Greater the" and insert -- Greater than the --, therefor.

In Column 20, Line 41, in Claim 3, delete "comprises" and insert -- comprises: --, therefor.

In Column 20, Line 46, in Claim 3, delete "PRT" and insert -- PRT; --, therefor.

Signed and Sealed this
Eighth Day of January, 2013

David J. Kappos
*Director of the United States Patent and Trademark Office*